United States Patent Office 3,343,606
Patented Sept. 26, 1967

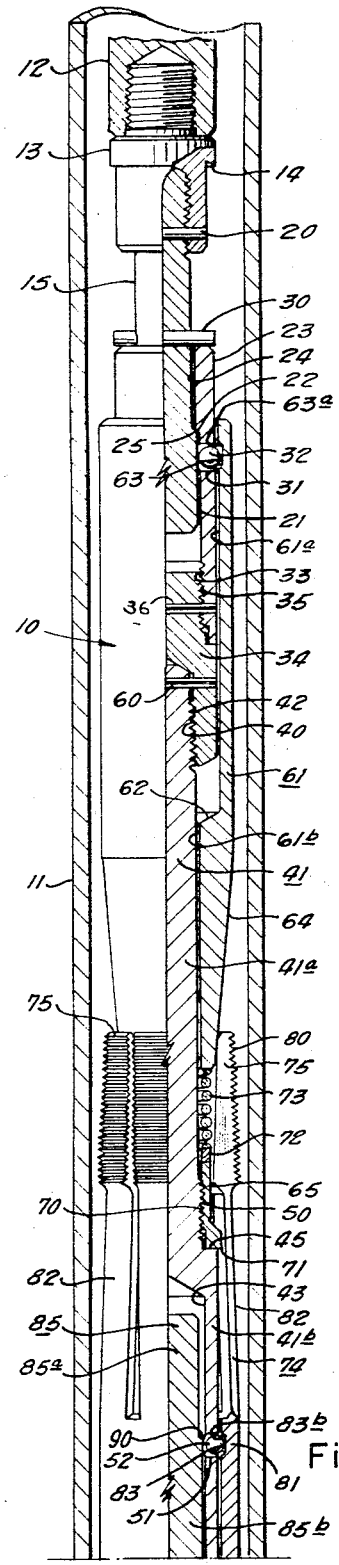
Fig. 1
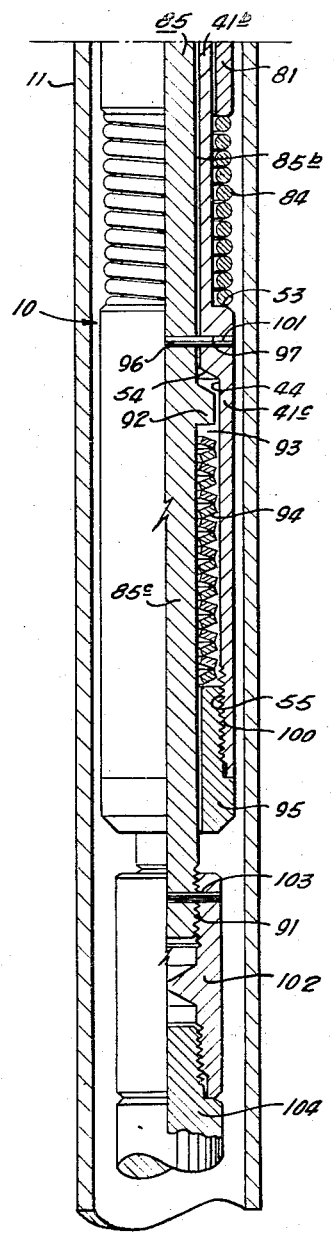
Fig. 1-A
INVENTOR
William W. Dollison

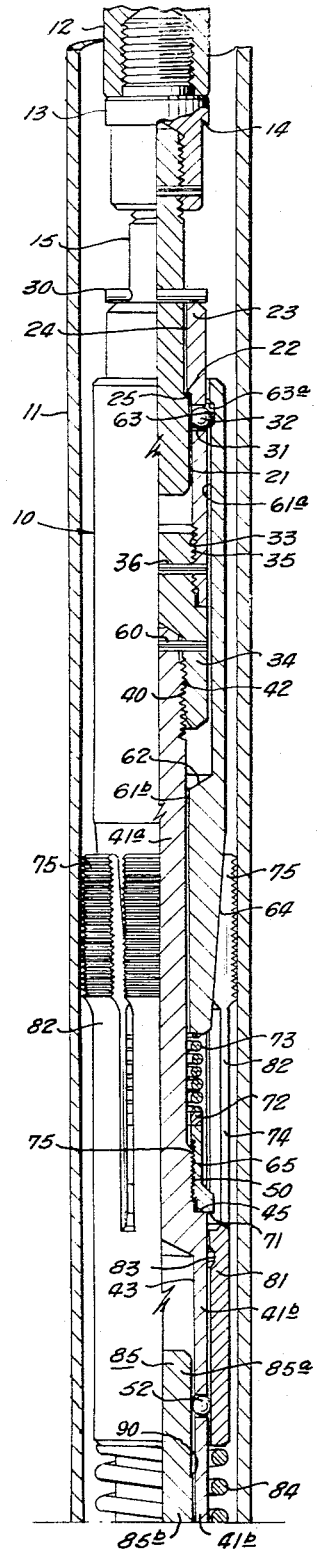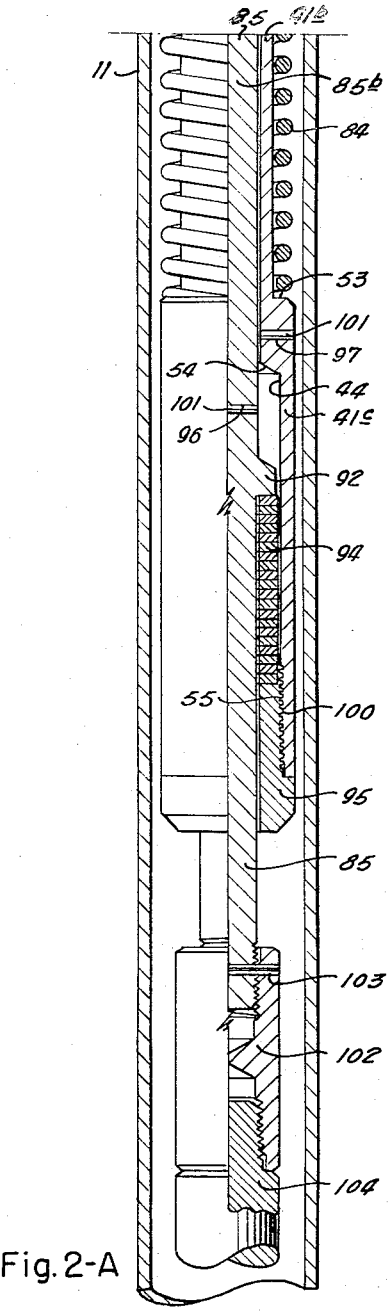
Fig. 2
Fig. 2-A

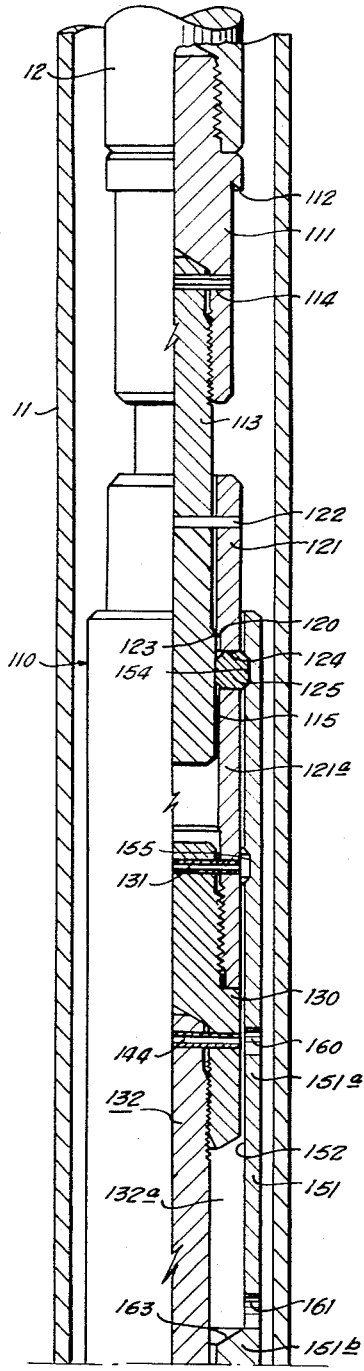
Fig. 4
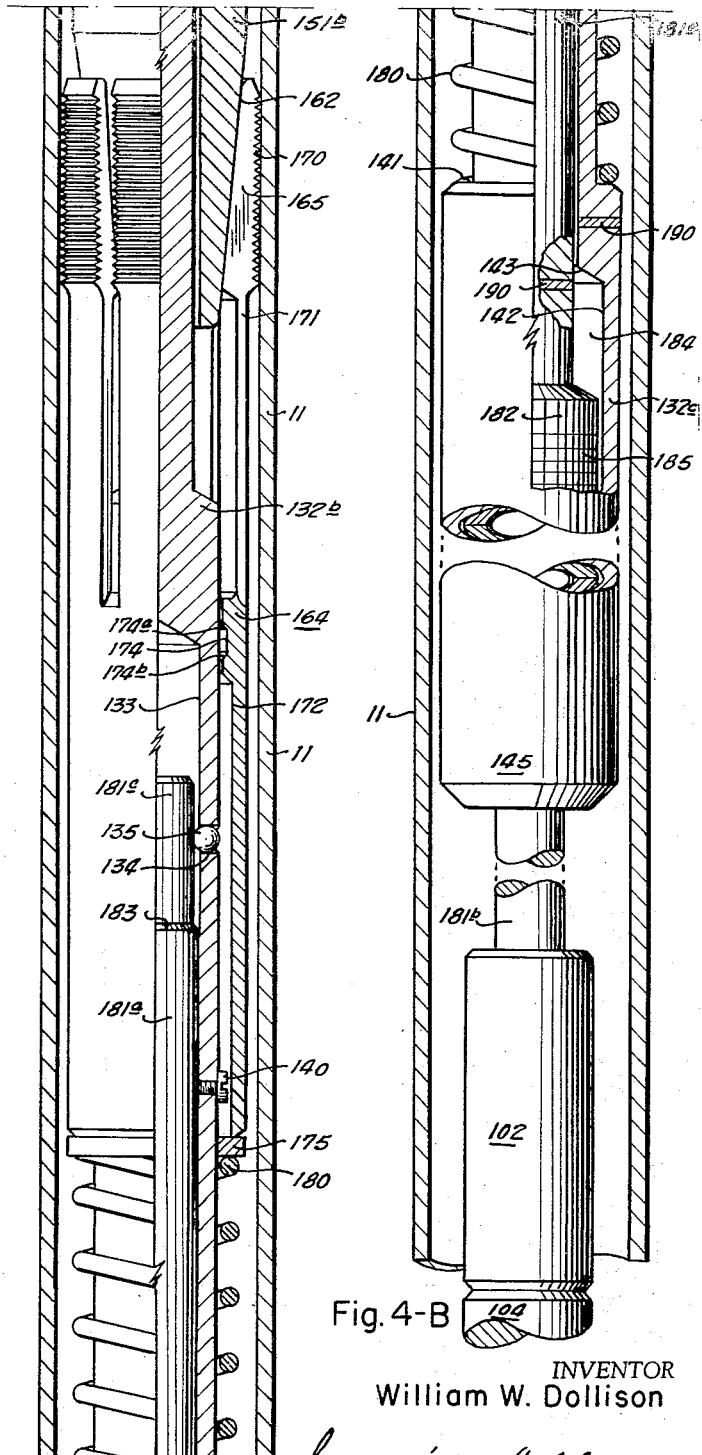
Fig. 4-A
Fig. 4-B
INVENTOR
William W. Dollison

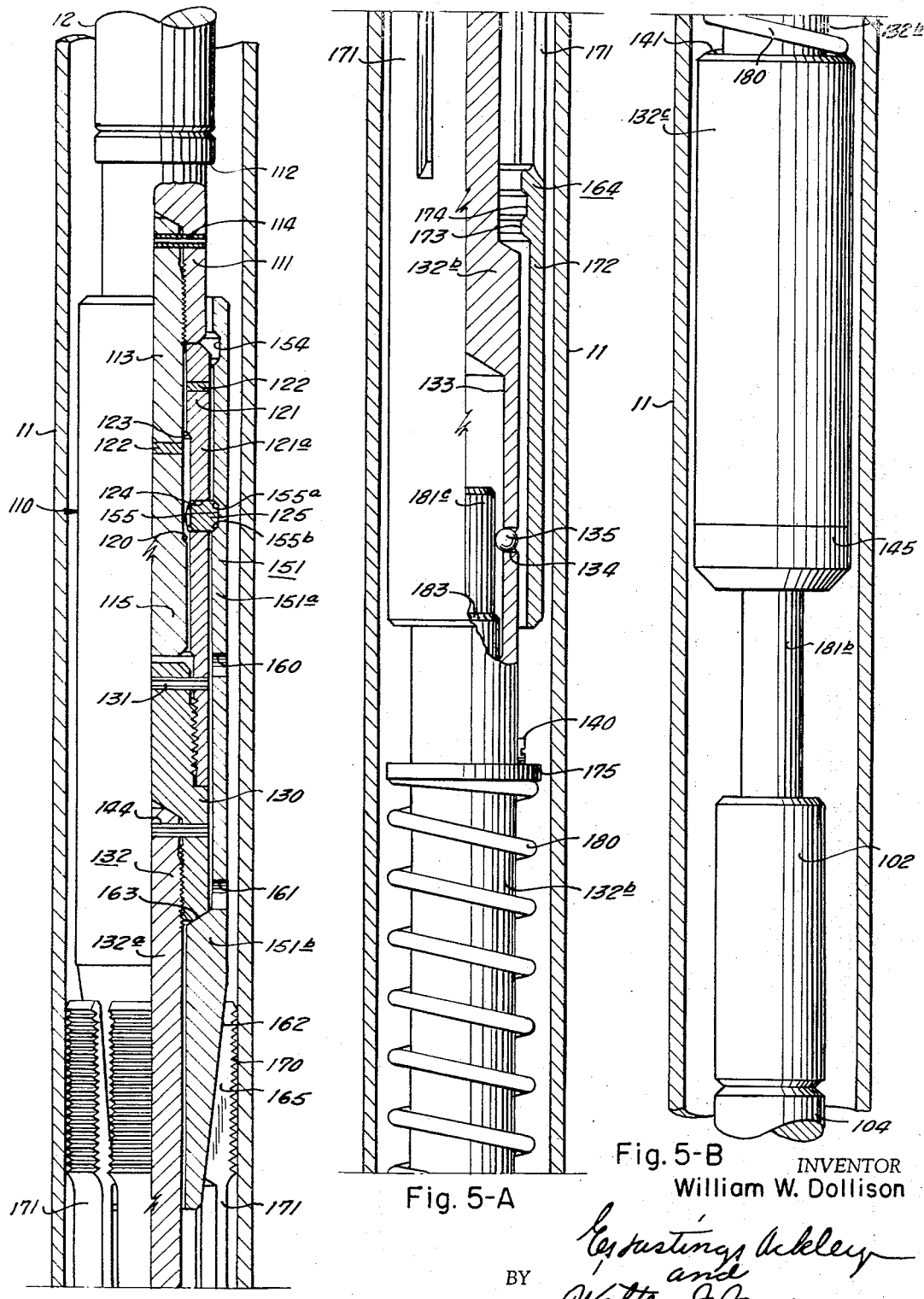

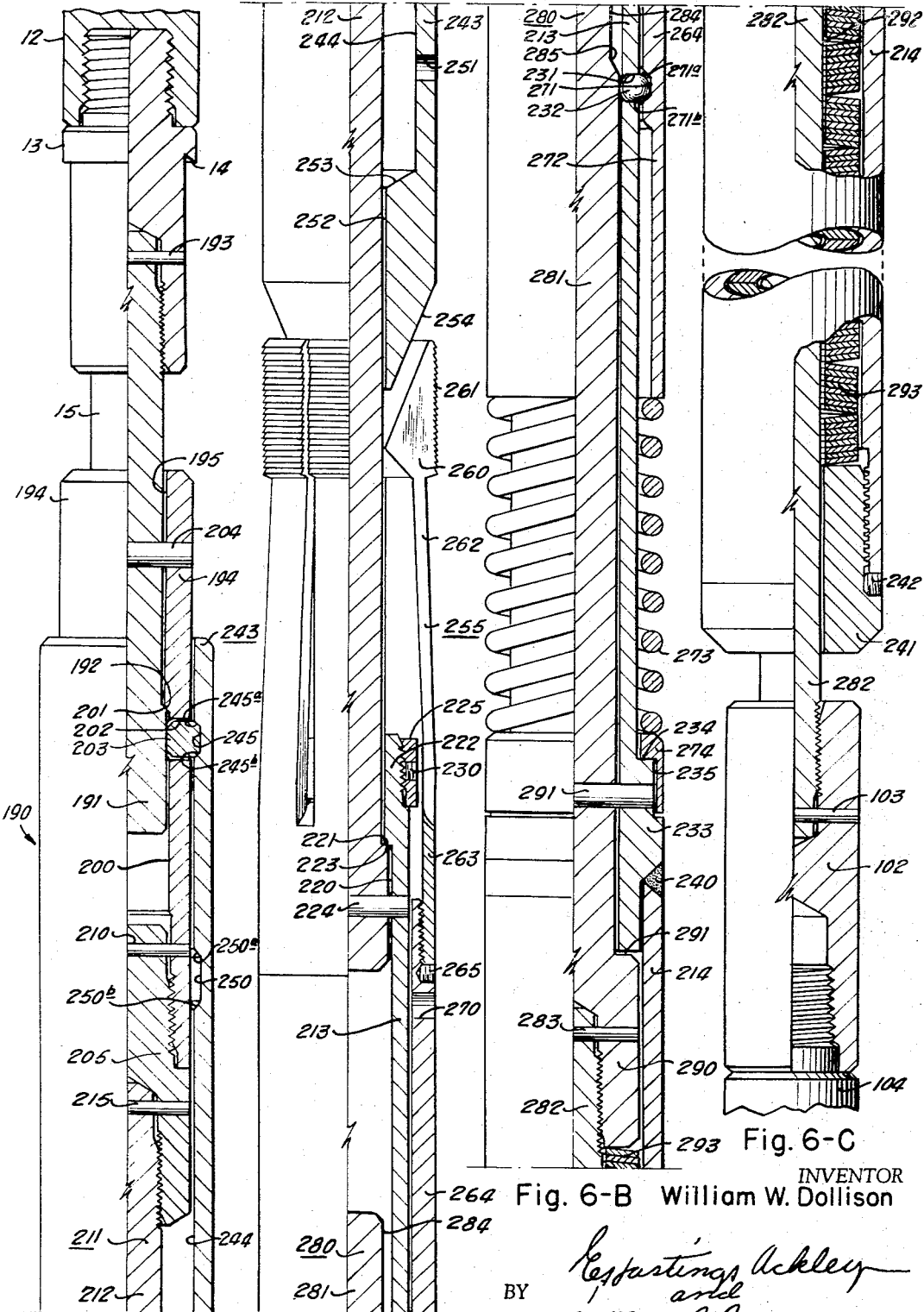
Fig. 6  Fig. 6-A  Fig. 6-B  Fig. 6-C

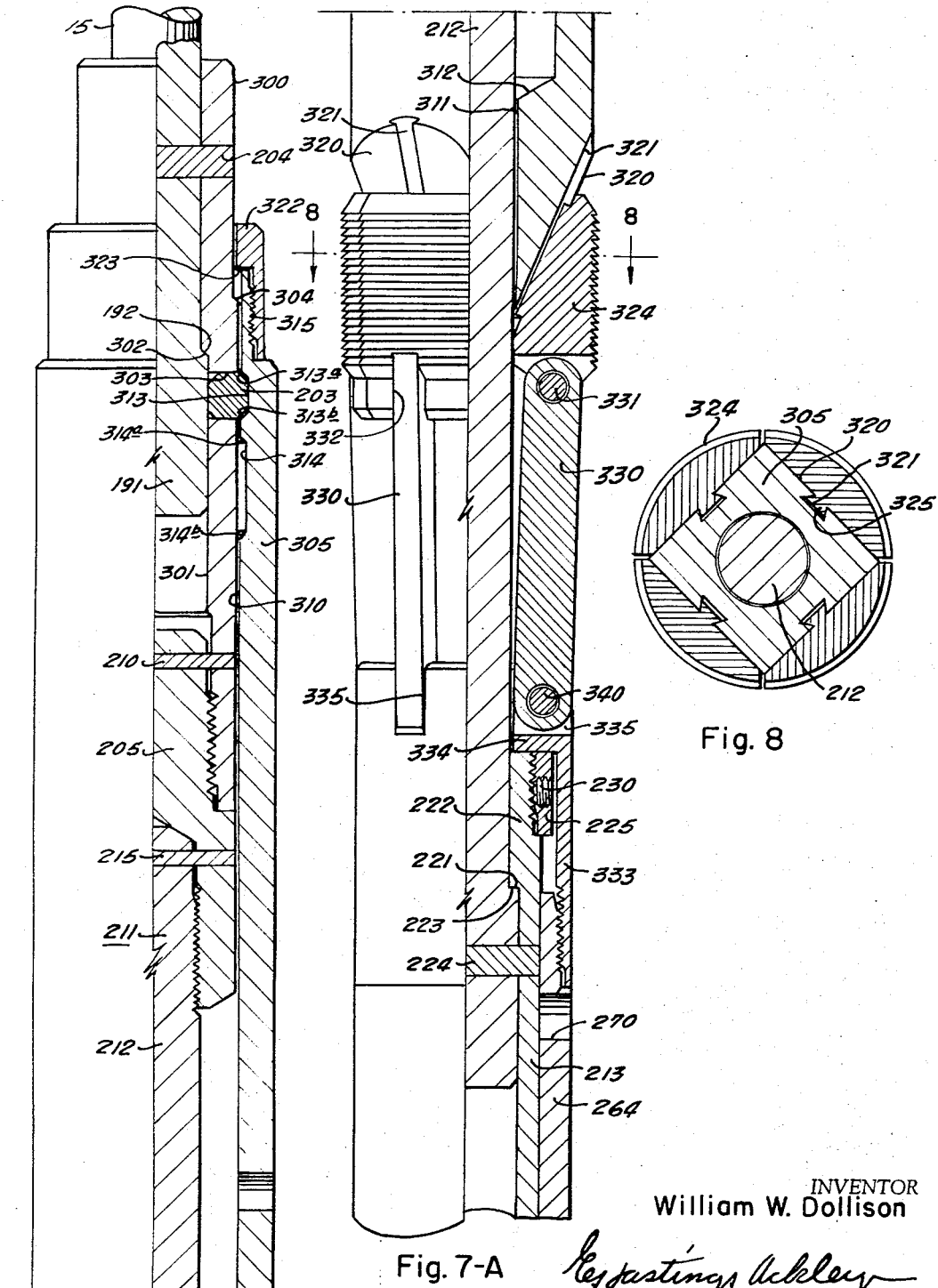

3,343,606
WELL TOOLS
William W. Dollison, Dallas, Tex., assignor to Otis Engineering Corporation, Dallas, Tex., a corporation of Delaware
Filed Feb. 11, 1965, Ser. No. 431,939
19 Claims. (Cl. 166—98)

ABSTRACT OF THE DISCLOSURE

An impact operated tool for providing a pulling force for actuating a well tool or other object in a well conductor, adapted for flexible line operation and for extended movement of the well tool or object.

---

Figure 3:
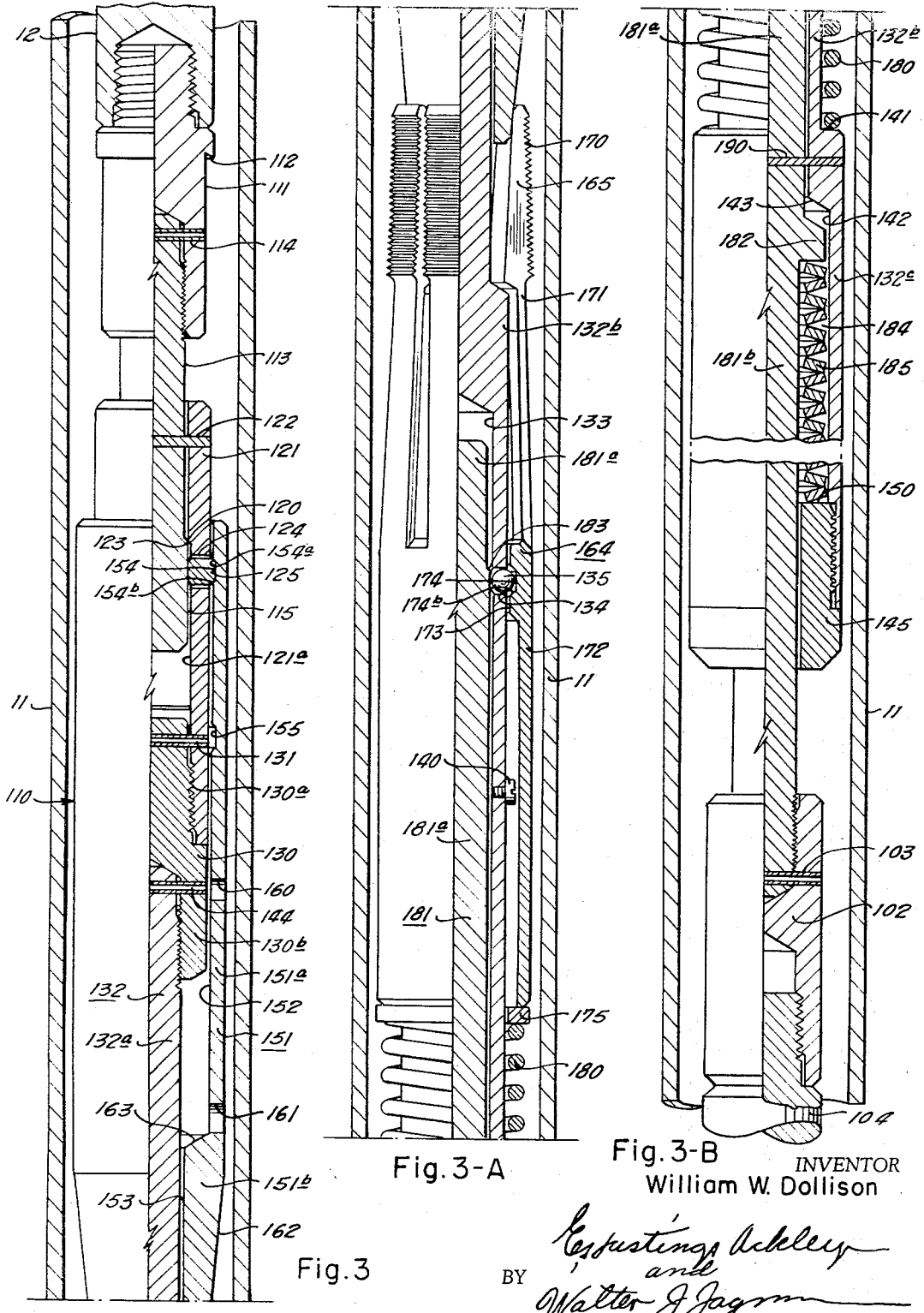

This invention relates to well tools and more particularly to a tool for applying a force to an object within a well bore.

It is a principal object of the invention to provide a tool for applying a force to an object within a well bore.

It is another object of the invention to provide a well tool adapted to perform useful work in connection with installing an object in or removing an object from a well bore.

It is a further object of the invention to provide a tool employed in applying a pulling force to an object being installed in or removed from a well bore.

It is a principal object of the invention to provide an apparatus for applying tension force to an object being placed in or removed from a location in a tubing or casing of a well bore.

It is a further important object of the invention to provide a well tool for applying a continuously increasing tension force on an object being placed at or removed from a location within a well bore.

It is a further object of the invention to provide a tool for applying a continuously increasing tension force to and maintaining such tension force on an object being placed in or removed from a well bore.

It is another important object of the invention to provide a tension tool in which a constantly increasing tension force is developed by a sequence of steps without relaxation of the force between each of the steps of increasing the magnitude of the force.

It is an additional object of the invention to provide a well tool which when incorporated in a wireline tool string will provide means for applying increasing amounts of tension below the tool to an object being pulled upon for purposes of setting the object in place or dislodging the object from a well bore.

It is a further object of the invention to provide a tension tool which may be disengaged from the well tubing or casing in which it is used by an impact force controlled from the surface.

It is still further object of the invention to provide a well tool for converting impact energy to a tension force between two members and for maintaining such tension force when the impact source is relaxed and when such source is re-energized to provide additional impact blows which then increase the tension force.

Additional objects and advantages of the invention will be readily apparent from the reading of the following description of a device constructed in accordance with the invention, and reference to the accompanying drawings thereof, wherein:

FIGURES 1 and 1–A taken together constitute a longitudinal view partially in elevation and partially in section of one form of a well tool constructed in accordance with the invention;

FIGURES 2 and 2–A taken together comprise a view partially in section and partially in elevation of the tool of FIGURE 1 showing the tool in "set" condition within a well tubing with the slips of the tool engaged with the inner wall of the tubing or casing;

FIGURES 3, 3–A and 3–B taken together constitute a view partially in section and partially in elevation of a modified form of the invention with the slips in retracted position for insertion of the tool into a well bore;

FIGURES 4, 4–A and 4–B constitute a longitudinal view partially in section and partially in elevation of the tool of FIGURES 3–3–B with the slips expanded into engagement with the well tubing and the tension spring of the tool compressed to apply tension to an object within the tubing;

FIGURES 5, 5–A and 5–B taken together constitute a view partially in section and partially in elevation of the tool of FIGURE 3 through 4–B with the slips disengaged from the lock mandrel and free to ride around the upper mandrel while the tool is either employed for other purposes or is being pulled from the tubing;

FIGURES 6, 6–A, 6–B and 6–C taken together constitute a longitudinal view partially in elevation and partially in section of another modified form of the tool of the invention;

FIGURES 7 and 7–A taken together constitute a longitudinal view partially in elevation and partially in section of a modified form of the well tool of FIGURES 6 through 6–C, illustrating alternative forms of the slip assembly and the lock mandrel; and, FIGURE 8 is a view in section taken along the line 8—8 of FIGURE 7–A.

Referring to FIGURES 1 and 1–A, a well tool 10 embodying the invention is shown positioned within a section of tubing or casing 11. The reference numeral 12 designates the member of a string of wireline tools to which the tool 10 is secured. The string of wireline tools includes jars by means of which upward or downward impacts or jars may be delivered to the well tool 10 in a manner well known to those skilled in the art. The well tool 10 includes a fishing neck 13 threadedly engaged with the member 12. The fishing neck is provided with a shoulder 14 to permit the engagement of a pulling tool. A fishing neck extension 15 is threadedly secured at its upper end in the lower end of the fishing neck. The fishing neck and the fishing neck extension are held against rotation relative to each other by a roll pin 20 which extends through the fishing neck and fishing neck extension. The fishing neck extension is enlarged along a lower portion 21 providing an external annular, upwardly facing shoulder 22. An extension lock 23 is slidably disposed about the fishing neck extension. The upper portion of the extension lock along a section 24 is reduced in internal diameter providing a downwardly facing internal shoulder 25 which cooperates with the shoulder 22 on the fishing neck extension to limit the upward movement of the fishing neck extension within the extension lock. A shear pin 30 secured through the fishing neck extension engages the upper end of the extension lock to limit the downward movement of the fishing neck extension relative to the extension lock. The engagement of the shoulders 22 and 25 and the engagement of the shear pin 30 with the top end of the extension lock holds the fishing neck extension and the extension lock against longitudinal movement relative to each other as long as the shear pin remains intact. The extension lock is provided with a plurality of radial ports 31 each of which accommodates a latch ball 32.

The lower end of the extension lock is internally threaded at 33 and secured to an adaptor 34 having an upper external threaded portion 35 into the lower end of the extension lock. A roll pin 36 prevents rotation of the adaptor relative to the extension lock. The adaptor has an internally threaded bore 40 in its lower end into which extends the upper threaded portion 42 of an upper mandrel 41. The upper mandrel comprises an upper solid section 41a, an enlarged, intermediate, hollow section 41b and a still further enlarged lower section 41c. The intermediate section 41b is provided with an internal bore 43 and the lower section 41c is provided with the bore 44 which is larger in diameter than the bore 43. At the juncture of the upper section and the intermediate section an external annular shoulder 45 is formed on the mandrel. A lower portion of the section 41a of the upper mandrel is externally threaded along a length 50 above the shoulder 45. The intermediate section of the mandrel is provided with a plurality of radially positioned holes 51 each of which accommodates a ball shaped locking element 52. At the juncture of the intermediate and lower sections of the upper mandrel an external annular shoulder 53 is formed around the mandrel. The upper end of the bore 44 of the lower section of the mandrel is defined by an internal annular shoulder 54. The lower end of the lower section 41c is internally threaded along a section 55. Rotation of the upper mandrel relative to the adaptor 34 is prevented by the roll pin 60 which extends through both the adaptor and the mandrel secured together.

A lock mandrel 61 is slidably positioned around the extension lock 23, the adaptor 34 and the upper section 41a of the upper mandrel. The lock mandrel has an upper bore 61a which is of a proper diameter to form a sliding fit around the extension lock and the adaptor while the lower portion of the lock mandrel is provided with a smaller bore 61b which is dimensioned to form a sliding fit around the upper portion 41a of the upper mandrel. At the juncture of the bore 61a and the bore 61b the lock mandrel is provided with an internal annular upwardly facing shoulder 62. Near the upper end of the lock mandrel an internal annular recess 63 is formed opening into the bore 61a and properly sized and located to receive the locking elements 32 for restraining the lock mandrel against longitudinal movement relative to the extension lock. The lower portion of the lock mandrel 61 along a length corresponding approximately to the bore 61b is provided with a downwardly and inwardly sloping external surface 64 which functions to expand the slips, as will be explained hereinafter.

A retainer ring 65 provided with internal threads 70 is secured around the lower portion of the section 41a of the upper mandrel with the retainer being held in position by engagement of the threads 70 with the threads 50 on the mandrel. The lower end of the retainer engages the shoulder 45 around the mandrel with the lower portion of the retainer being sufficiently larger in diameter than the section 41b of the upper mandrel to provide an annular, downwardly facing shoulder 71 at the upper end of the section 41b. An annular spacer washer 72 is positioned around the upper mandrel on the upper end of the retainer ring 65. The spacer washer may be of any desired width to provide the desired compression in a coil spring 73 positioned around the upper mandrel section 41a confined between the lower end of the lock mandrel 61 and the upper face of the washer 72. The spring 73 functions to urge the lock mandrel 61 in an upward direction for purposes which will be explained hereinafter.

A slip assembly 74 is slidably positioned around the upper mandrel and actuatable to lock the tool 10 against downward longitudinal movement within the well casing. The slip assembly comprises slips 75 each having a serrated or toothed external surface 80. The slips are connected to a base ring 81 by the resilient arms 82. The base ring, the arms and the slips in the particular embodiment illustrated are formed integral with each other making the slip assembly a single unitary structure. It will be recognized, however, that these various members of the slip assembly may be constructed of separate parts connected together by any suitable means. The base ring is provided with an internal annular recess 83 which receives the ball shaped locking elements 52 for locking the slip assembly on the upper mandrel. A coil spring 84 is positioned around the lower section 41b of the upper mandrel and confined between the lower end of the slip assembly and the shoulder 53 on the mandrel. The upper end of the coil spring contacts the lower end of the base ring of the slip assembly to urge the slip assembly in an upward direction.

A lower mandrel 85 is positioned within the intermediate and lower sections of the upper mandrel with a minor length of the lower mandrel extending below the lower end of the upper mandrel, as shown in FIGURE 1-A. An upper section 85a of the lower mandrel is slightly reduced in diameter to provide an external annular shoulder 90 around the mandrel to cooperate with the locking elements 52 for purposes of controlling the slip assembly in a manner which will be explained hereinafter. The lower end of the lower mandrel is provided with external threads 91. The section 85b of the upper mandrel below the shoulder 90 forms a sliding fit with the bore 43 of the section 41b of the upper mandrel. Below the section 85b the lower mandrel has formed thereon an external annular flange 92 which is positioned within the bore 44 of the lower section of the upper mandrel. The section 85c of the lower mandrel below the flange 92 is sufficiently smaller than the bore 44 of the upper mandrel to provide an annular space 93 between the lower section 41c of the upper mandrel and then the lower section of the lower mandrel. A plurality of compressible members 94 are positioned within the annular space 93 around the lower mandrel below the flange 92. In the embodiment illustrated the compressible members 94 are Belleville washers. The members 94 are held within the annular space by the lower sub 95 which has external threads engaging the internal threads 55 of the lower section of the upper mandrel. As illustrated in FIGURE 1-A the lower mandrel and the upper mandrel are initially secured together by a shear pin 101.

An adaptor sub 102 is threadedly engaged on the lower end of the lower sub and restrained against rotation relative to the lower sub by the roll pin 103 which extends through both the adaptor sub and the lower portion of the lower mandrel. A suitable tool 104 is secured to the lower end of the adaptor sub for positioning or pulling an object within the well bore.

The well tool 10 may be employed as a part of a wireline tool string used for the purpose of placing objects in or removing objects from a tubing or casing of a well. For example, the well tool 10 may be incorporated in the wireline tool string illustrated at page 3742 of volume 3, Composite Catalogue of Oil Field Equipment and Services, 1964-65 edition, published by World Oil, Houston, Tex., which includes jars and a knuckle joint, the well tool being secured in the string between the jars and the knuckle joint. For example, as shown in FIGURE 1 herein, the tool 12 secured to the upper end of the well tool 10 may be the lowermost of the jars shown in the wireline tool string illustrated in the reference. The knuckle joint will thus be the tool 104 illustrated here in FIGURE 1-A.

The FIGURES 1 and 1-A represent the relative positions of the various parts or elements of the tool 10 at the time the tool is run into a well as a part of a tool string. In preparing the well tool for "running in" as a part of the wireline tool string, the tool is assembled, as illustrated in FIGURES 1 and 1-A, with the exception of the insertion of the shear pins 30 and 101. The shear strength of the pin 30 is appreciably greater than that of the shear pin 101. The shear pin 101 needs only to be strong enough to permit engagement of the running or pulling tool of the wireline tool string with the object to be set or pulled. In other words, the shear pin 101 must be sufficiently strong that it will not shear during the lowering of the tool string into the well and into engagement with an object within the well on which an upward force is to be exerted. With the tool assembled to the point of inserting the shear pins 30 and 101, the spring 84 is compressed by forcing the slip assembly 74 in a downward direction and holding the assembly at a position which will locate the recess 83 in alignment with the latch balls 52. The lower mandrel is then pushed in an upward direction into the upper mandrel until the hole 96 in the lower mandrel and the hole 97 in the upper mandrel are in alignment at which time the shear pin 101 is inserted through the mandrels to secure them together, as illustrated in FIGURE 1–A. During the process of positioning the mandrels such that the shear pin may be inserted, the lower mandrel is raised into the lower end of the upper mandrel with the shoulder 90 on the upper portion of the lower mandrel moving past the latch balls 52 and thus expanding the balls outwardly into the recess 83 with the outer surface of the portion 85b of the lower mandrel holding the latch balls in the position illustrated to lock the slip assembly against upward movement relative to the upper mandrel. The slip assembly is then held against upward movement by the engagement of the latch balls 52 with the annular surface of the base ring 81 defining the lower side of the recess 83. The locking mandrel 61 is now pushed in a downward direction compressing the spring 73 until the recess 63 is positioned in alignment with the latch balls 32. The fishing neck extension 15 is then pulled upwardly until the shoulders 22 and 25 are engaged with each other as shown in FIGURE 1. The outer surface of the lower section 21 of the fishing neck extension holds the latch balls 32 in the recess 63 to lock the lock mandrel 61 to the extension lock 23 in the lower position illustrated in FIGURE 1. The lock mandrel is so positioned that the tapered slip expander surface 64 of the mandrel is in an upper position relative to the slips 75 so that the slips are in their retracted positions and the tool may be readily moved through a tubing string. When the shoulders 22 and 25 are engaged, the shear pin 30 is inserted through the fishing neck extension as shown in FIGURE 1 so that the fishing neck extension is locked against downward movement relative to the extension lock by the engagement of the shear pin with the upper end of the extension lock. With the tools so assembled and the shear pins 30 and 101 positioned in the manner just described, the wireline tool string is lowered into the well tubing until the object to be set or pulled is engaged by the appropriate tool on the lower end of the tool string. As previously indicated the shear pin 101 must be of sufficient strength to permit such engagement of the pulling tool with the object to be pulled. In fact, the shear pin 101 should have sufficient strength to allow the operator of the wireline tool string to lift the tool string enough to ascertain whether or not a positive latch to the object to be pulled has been achieved.

When the object to be pulled has been latched to the pulling tool of the wireline tool string, the tool 10 is subjected to either upward or downward impacts to shear the pin 101. For example, the impact force may originate with the jars and is applied to the tool 10. The impact force travels through the fishing neck, the extension lock 23 and the adaptor 24 to the upper mandrel 41. If the impact force is downward, the fishing neck extension applies the force to the extension lock 23 by means of the shear pin 30. If the impact force is upward the force is transmitted from the fishing neck extension through the annular shoulder 25 to the internal annular shoulder 22 within the extension lock 23. In the case of either upward or downward impact force, the upper mandrel and thus the section 41b of the upper mandrel tends to move relative to the lower mandrel 85 and thus shears the pin 101 resulting in the freeing of the upper and lower mandrels for longitudinal movement relative to each other.

When the shear pin 101 is sheared, an upward strain is placed upon the fishing neck extension 15 causing the fishing neck to pull the upper mandrel in an upward direction relative to the lower mandrel which is secured to the object to be pulled and thus resists upward movement. The upward force exerted on the fishing neck extension 15 lifts the upper mandrel causing the intermediate section 41b of the mandrel to move the latching balls 52 along the surface of the lower mandrel until the locking elements move above the shoulder 90 at which time the latch balls are cammed inwardly around the portion 85a of the lower mandrel by the upper surface or shoulder 83b defining the upper side of the recess 83. With the latch balls 52 cammed inwardly, the slip assembly is released for movement on the upper mandrel and is then pushed upwardly by the spring 84, the slips 75 moving outwardly as they slide upwardly along the tapered expander surface 64 of the lock mandrel 61. The spring forces the slips upwardly until the toothed surfaces 80 of the slips engage the inner wall of the tubing. The wedging of the slips between the tubing wall and the tapered expander surface of the lock mandrel secured the lock mandrel 61 and the upper mandrel 41 against downward movement relative to the tubing. Thus, the well tool is in condition to impose an upward force on the object since the jars are secured to the upper end of the upper mandrel, the lower end of the lower mandrel 85 is connected to the object to be pulled by the tool, and the slip assembly by its engagement with the tubing wall holds the lock mandrel 61 and therefore the upper mandrel 41 to which it is latched by the latch balls 32, against downward movement in the tubing.

With the tool secured in operating condition within the well tubing as described in detail above, the jars connected in the wireline tool string above the tool 10 are actuated to deliver an upward impact or jar to the fishing neck extension 15. The upward jar delivered to the fishing neck extension is transferred to the extension lock 23 by contact of the annular surfaces 25 and 22. Upward movement of the fishing neck extension forces the surface 25 against the surface 22 thus applying an upward force to the extension lock. The upward force on the extension lock is transmitted to the upper end of the upper mandrel 41 through the adaptor 34. Upward movement of the upper mandrel, which is free to move upwardly relative to the lower mandrel since the pin 101 is now sheared, moves the lower sub 95 in an upward direction since the sub is threadedly engaged on the lower end of the lower section 41c of the upper mandrel. Upward movement of the lower sub pushes the compressible members 94 in an upward direction. Since the uppermost of the compressible members is engageable with the flange 92 on the lower mandrel 85 and the lower mandrel is connected to the object to be pulled the compressible members are compressed in accordance with the distance the lower sub is moved in an upward direction relative to the lower mandrel. Thus the object to be pulled tends to restrain the lower mandrel against upward movement while the upward jars delivered to the upper mandrel result in the upward movement of the lower sub 95 effecting compression of the compressible members 94 due to their confinement between the upper end of the lower sub and the flange 92. As the members 94 are compressed they exert a force on the lower mandrel tending to move it upwardly. The upper mandrel is restrained against downward movement by the slips and thus a pulling force is exerted on the object to which the lower mandrel is connected.

The impact force exerted through the fishing neck extension 15 resulting in the compression of the members 94 as explained above also is transmitted to the ball locking elements 32 by the lower faces of the ports 31 in the extension lock with the locking elements then pressing upwardly against the upper shoulder 63a of the recess 63 within the lock mandrel 61 and the lock mandrel 61 is moved upwardly a small distance by the impact force exerted through the locking elements 32 resulting in the tapered surface 64 of the lock mandrel being moved upwardly relative to the slips 75 allowing their inward movement and thus permitting the slips to move upwardly relative to the tubing. After the lock mandrel has been moved upwardly by the impact force, and the slips are thus freed for upward movement relative to the tubing the slip assembly 74 is moved upwardly on the upper mandrel by the spring 84 causing the slips 75 to again be displaced outwardly and into locking engagement with the tubing wall as the slips move upwardly on the tapered surface 64 of the lock mandrel. The upward movement of the slip assembly lags behind the upward movement of the lock mandrel and the upper mandrel sufficiently to allow the lock mandrel and the upper mandrel to move upwardly a short distance before the slips are again set in locking engagement with the tubing wall to lock the locking and upper mandrel at a new higher position within the tubing. The lag of the slip assembly behind the lock mandrel is due to the fact that the lock mandrel moves upwardly directly in response to each upward impace force because of the essentially rigid connection of the lock mandrel through the latch-balls 32 to the extension lock 23 and the fishing neck extension 15, whereas the slip assembly is connected to the extension lock and fishing neck extension through the spring 84 and the other previously recited elements including the upper mandrel and adaptor 34. These latter elements, particularly the spring 84, absorb the impact force before reacting to such force resulting in the time delay before the force applied through the spring moves the slip assembly upwardly.

After the energy of an impact force has been expended and the slip assembly has re-engaged the tubing wall, the compressible members 94 will tend to expand and exert a downward force on the lower sub 95 which force is applied through the upper mandrel 41 to the adaptor 34 to pull the extension lock 23 downwardly. Downward movement of the extension lock causes the locking elements 32 to move downwardly into engagement with the lower face of the internal recess 63 within the lock mandrel 61. With the locking elements engaged with the lower face of the recess within the lock mandrel any further expansion of the members 94 will result in further downward movement of the lock mandrel beneath the slips to more securely expand the slips against the wall of the tubing. The total energy stored in the compressible members 94 by any particular impact force is not expended by the above described procedures and thus energy within the compressible members is stored and applied in the form of tension between the object being pulled and the tool through the medium of the annular flange 92 and the lower section of the lower mandrel 85 together with the connecting members including the adaptor sub 102.

Each impact force delivered to the upper mandrel through the fishing neck extension results in an upward relocation of the slip assembly, a setting of the slip assembly at the new location, a further compression of the compressible members and therefore an increase in the force exerted thereby tending to move the lower mandrel upwardly relative to the upper mandrel and the tubing. The impact forces or jars are applied repeatedly resulting in a sequential upward relocation of the slip assembly and further compression of, and storing of energy within, the compressible members 94. Since only a portion of the energy stored in the compressible members as a result of each impact blow is expended in relocating the lock mandrel, a constantly increasing tension force is exerted through the lower mandrel to the object being pulled upon. The impact blows may be continued until the object being pulled upon is positioned at the desired location, has been freed from its stuck condition within the tubing, or until the compressible members 94 have been fully compressed. If the stuck object is not dislodged, the impact blows may be continued until the members 94 are compressed into essentially a solid body permitting no further compression. Subsequent to the total compression of the members 94 any further impact force would obviously result in damage to the tool and thus it must be disengaged if at this point the stuck object is not dislodged. The wireline tool string is generally disengageable from the object being pulled by severing a shear pin in the pulling tool connected to the object. Such mechanism is conventional and forms no part of the present invention. For example, a suitable pulling tool having shear pin disconnect means is shown at page 3746 of the 1964–65 Edition of the Composite Catalogue of Oil Field Equipment and Services, published by World Oil, Houston, Tex.

If the compressible members 94 are arranged in sufficient strength configurations that they will absorb energy equal to or in excess of the total amount of impact energy delivered to the tool a "stall" condition could be reached in which no further practical increase in the pulling force exerted on the stuck object can be obtained by further impact forces. However, further impact forces or jars could cause a variation in the tension stresses between the tool and the stuck object which might be beneficial in dislodging the object from the well bore.

Thus, the application of a series of impact forces or jars produces a constantly increasing upward force on the object to be pulled while the tool progressively climbs within the well tubing by virtue of the locking action of the slip assembly.

When it is desired that the tool be disengaged from the wall of the tubing, a downward impact force or jar is delivered to the fishing neck extension 15 resulting in shearing the shear pin 30 allowing the fishing neck to move in a downward direction relative to the extension lock. The fishing neck is pushed downwardly until the annular shoulder 25 passes below the locking elements 32 permitting the locking elements to move inwardly around the smaller diameter of the portion of the fishing neck extension above the annular shoulder 25. The inward movement of the locking elements from the recess 63 in the lock mandrel 61 releases the lock mandrel from the extension lock 23. At this point the energy stored in the spring 73 may push the lock mandrel up sufficiently to free the slips 75 from engagement with the tubing wall. However, it is probable that in addition to the freeing force exerted against the lock mandrel by the spring 73 the members 94 and the spring 84 will expand to force the upper mandrel 41 in a downward direction. Since the extension lock 23 is free from the lock mandrel and assuming the fishing neck 15 is downward a sufficient distance to allow freedom of movement of the extension lock, the compressible members 94 acting against the bottom sub 95 may pull the upper mandrel downwardly causing the shoulder 71 on the lower end of the ring 65 to engage the upper end of the base ring 81 of the slip assembly to dislodge the slips from their engagement with the tubing wall.

Should the previously described procedures not result in disengagement of the slip assembly from the tubing wall such disengagement may be brought about by downward impact blows which may serve to drive the slips downward along the sloping surface 64 of the lock mandrel. An examination of FIGURE 2 reveals that the distance between the lower end of the adaptor 34 and the internal annular shoulder 62 within the lock mandrel is greater than the distance between the shoulder 71 and the upper end of the base ring 81 of the slip assembly. These relative dimensions when the slips are in engagement with the tubing wall permit downward blows delivered through the fishing neck extension to urge the slip assembly downwardly relative to the lock mandrel 61. The lower end of the fishing neck extension strikes the upper end of the adaptor 34. The adaptor 34 forces the upper mandrel 41 in a downward direction carrying downwardly the ring 65. The annular shoulder 71 on the lower end of the ring 65 strikes the upper end of the base ring of the slip assembly causing downward movement of the slips relative to the lock mandrel. Since the distance between the bottom end of the adaptor 34 and the shoulder 62 within the lock mandrel is greater than the distance between the shoulder 71 and the upper end of the base ring of the slip assembly this contact between the shoulder 71 and the base ring can be brought about without the lower end of the adaptor 34 striking the shoulder 62 within the lock mandrel. Therefore the downward blows delivered to the fishing neck extension may move the slips downwardly relative to the lock mandrel and effect their disengagement from the inner wall of the tubing. With the tool released from the tubing wall the object to be removed from the well tubing is lifted out by the wireline tool string, or if the object is being set within the well tubing, the tool is released from the object by suitable means.

It will now be seen that there has been described and illustrated a new and improved form of tool for applying a force to an object within a well bore.

It will be further seen that there has been described and illustrated a well tool which is adapted to perform useful work in connection with installing an object in or removing an object from a well bore.

It will be additionally seen that the well tool described and illustrated herein is employed to apply a pulling force to an object being installed in or removed from a well bore.

It will be additionally seen that there has been provided a well tool which is capable of imposing a continuous and steadily increasing force on an object being placed in or removed from a location with a well bore.

It will also be seen that the well tool described herein develops a constantly increasing force without relaxation of the force between the steps employed in increasing the magnitude of the force.

It will also be seen that the well tool when incorporated into a wireline tool string provides means for applying increasing amounts of upward force to an object being pulled upon for purposes of setting the object in place or dislodging the object from a struck condition within the well bore.

It will be further seen that the tension tool is disengageable from the well tubing or casing in which it is used in response to steps initiated at the surface.

It will be evident that the well tool provides a means for converting impact energy to tension between two members and for maintaining such tension while the impact source is relaxed and re-energized to provide additional impact blows employed for increasing the tension provided by the tool.

It will also be seen that the tension tool is provided with means for anchoring the tool to the inner wall of a tubing or casing such means being adapted to be relaxed and relocated progressively upwardly within a well bore during the process of increasing the tension force being applied to the object to which the tool is secured.

FIGURES 3, 3–A and 3–B illustrate a modified form of the well tool. Referring specifically to FIGURE 3 a well tool 110 is supported within the tubing 11 by the member 12. As discussed above in connection with the embodiment of the well tool illustrated in FIGURES 1 through 2–A the member 12 may be a tool within a wireline tool string such as a jar employed for actuating the well tool. A fishing neck 111 having a downwardly facing external annular shoulder 112 is secured into the lower end of the member 12. A fishing neck extension 113 is threadedly engaged into the lower end of the fishing neck and secured against rotation therein by a roll pin 114 which extends through both the fishing neck and the fishing neck extension 113. The fishing neck extension 113 has a lower section 115 of enlarged diameter at the upper end of which an external annular shoulder 120 is formed. An extension lock 121 is slidably positioned around the fishing neck extension and initially secured thereto by a shear pin 122. The extension lock has an enlarged lower bore 121a to conform to the enlarged portion 115 of the fishing neck extension. The extension lock is provided with an internal annular shoulder 123 at the upper end of the bore 121a, the shoulder 123 cooperating with the shoulder 120 around the fishing neck extension to limit upward movement of the fishing neck extension relative to the extension lock. A plurality of slots 124 extend through and are radially positioned around the extension lock. A latch element 125 is positioned in each of the holes 124. An adaptor 130 is threadedly secured into the lower end of the extension lock 121 and secured thereto by a roll pin 131. The adaptor has a reduced externally threaded upper section 130a and internally threaded lower section 130b. An upper mandrel 132 is threadedly engaged into the lower end 130b of the adaptor. The upper mandrel comprises an upper solid section 132a, a larger intermediate section 132b, and a still larger lower section 132c. The intermediate section is provided with a bore 133. A plurality of radially positioned holes 134 are provided through the intermediate section, each of the holes containing a latch ball 135. One or more of the stop members 140, which may be screws, are engaged around the intermediate section with the heads of the screws being positioned on the outer surface of the mandrel, as illustrated in FIGURE 3–A. An upwardly facing external annular shoulder 141 is formed around the upper end of the lower section 132c of the upper mandrel. The lower section of the mandrel is provided with an internal bore 142 terminating at the upper end thereof in an internal annular shoulder 143. The upper mandrel is secured against rotation relative to the adaptor 130 by a roll pin 144 which extends through both the adaptor and the upper end of the mandrel. A bottom sub 145 is threadedly engaged into the lower end of the upper mandrel the upper end of the bottom sub forming an internal shoulder 150 with the lower section of the upper mandrel.

Referring to FIGURES 3 and 3–A, a lock mandrel 151 having an upper section 151a and a lower section 151b is slidably positioned around the extension lock 121, the adaptor 130 and the upper section 132a of the upper mandrel. The upper section 151a of the lock mandrel is provided with a bore 152, the diameter of which is sized to form a sliding fit around the extension lock 121 and the adapter 130 while the lower section 151b of the lock mandrel is provided with a bore 153 which forms a sliding fit with the upper section 132a of the upper mandrel. The upper section 151a of the lock mandrel is further provided with an internal annular upper recess 154 and a lower internal annular recess 155, each of these recesses being adapted to receive the latch elements 125 to lock the lock mandrel against longitudinal movement relative to the extension lock 121. The recess 154 is provided with a downwardly and outwardly sloping face 154a and an upwardly and outwardly sloping face 154b. The recess 155 has an upper downwardly and outwardly sloping face 155a and a lower upwardly and outwardly sloping face 155b. The upper section of the lock mandrel is also provided with openings 160 and 161 to provide access to the roll pins. The lower section 151b of the lock mandrel is provided with a downwardly and inwardly sloping slip expanded surface 162. Formed within the lock mandrel at the lower end of the upper section 151a is an internal annular shoulder 163 adapted to cooperate with the lower end of the adaptor 130 for purposes which will be explained.

A slip assembly 164 is slidably engaged around the upper mandrel. The slip assembly comprises slips 165 having outer toothed surfaces 170, resilient arms 171, and a base ring 172 to which the arms are secured. The slip assembly may be formed in separate pieces or the base ring along with the arms and the slips may be constructed of a single piece of material. The arms 171 are resilient to permit lateral movement of the slips. The base ring 172 of the slip assembly is reduced in internal diameter along a section 173 to form a sliding fit around the external diameter of the intermediate section 132b of the upper mandrel. The section 173 of the base ring of the slip assembly is provided with an internal annular recess 174 adapted to receive the latching elements 135 for locking the slip assembly against longitudinal movement relative to the upper mandrel. An annular ring 175 is slidably engaged around the intermediate section 132b of the upper mandrel and adapted to contact the lower end of the base ring 172. A coil spring 180 for biasing the slip assembly upwardly is positioned around the intermediate section of the upper mandrel confined between the ring 175 and the shoulder 141.

As illustrated in FIGURES 3–A, and 3–B, a lower mandrel 181 is positioned within the upper mandrel with a short length of the lower end of the lower mandrel extending below the bottom sub 145. The lower mandrel 181 includes an upper section 181a and a lower section 181b. An external flange 182 is formed around the lower mandrel between the upper and lower sections. The upper section of the lower mandrel has a portion 181c of reduced diameter at the lower end of which an external annular shoulder 183 is formed. As shown in FIGURE 3–B the external diameter of the lower section 181b of the lower mandrel is substantially smaller than the diameter of the bore 142 of the lower section 132c of the upper mandrel thereby providing an annular space 184 between the lower sections of the upper and lower mandrels. A plurality of compressible members 185 are confined within the annular space 184 between the flange 182 and the upper face 150 of the bottom sub 145. As also shown in FIGURE 3–B, the upper and lower mandrels are initially secured together by a shear pin 190 which restrains the mandrels against movement relative to each other so long as the shear pin remains intact.

The adaptor sub 102 is threadedly engaged on the lower end of the lower mandrel and secured against rotation relative to the lower mandrel by a roll pin 103 extending through the lower mandrel and the sub. A suitable tool 104 is connected to the adaptor sub for positioning or pulling an object within the well bore.

In operation the modified tension tool 110 is incorporated in a wireline tool string in the manner discussed above in connection with the well tool illustrated in FIGURES 1 through 2–A. In assembling the well tool preparatory to installing it in the tool string, a shear pin 122 is chosen which is sufficiently stronger than the shear pin 190 to insure that the shear pin 190 will be the first to be sheared in order to disconnect the upper and lower mandrels from each other to permit proper operation of the tool. Of course, as discussed above, the shear pin 190 must be of sufficient strength to permit the necessary manipulations of the well tool to allow engagement with the object to be positioned in or to be pulled from the well bore. When the tool string is lowered into a well bore and secured to the object to be positioned or pulled, an upward jar is effected which exerts an upward force on the fishing neck extension 113 to shear the pin 190 to release the upper and lower mandrels from each other. The impact force to shear the pin 190 imposed through the fishing neck extension is transferred from the fishing neck extension by the annular face 123 to the face 120 within the extension lock 121. The upward force on the extension lock is transmitted through the adaptor 130 to the upper end of the upper mandrel 132. The upward movement of the upper mandrel causes the mandrel to be lifted relative to the lower mandrel and if the force is sufficiently greater than can be withstood by the shear pin 190 the shear pin is sheared freeing the upper mandrel to move in an upward direction relative to the lower mandrel. The lower mandrel is connected through the sub 102 to the object to be manipulated by the tool and thus is held against upward movement until the object moves. With the upper mandrel moving in an upward direction relative to the lower mandrel the latch balls 135, as shown in FIGURE 3–A, are cammed inwardly around the smaller diameter of the upper section 181c of the lower mandrel. Since the slip assembly is biased in an upward direction by the spring 180 acting through the washer 175 against the lower end of the slip assembly, the upwardly and inwardly sloping lower face 174b of the recess 174 produces an inward force on the latch balls 135 to cause them to be cammed inwardly thus freeing the base ring 172 to be moved upwardly by the spring. Since the base ring, arms 171, and the slips 165 form a unitary structure, movement of the base ring causes the slips to move upwardly and outwardly along the slip expander surface 162 of the lock mandrel. As shown in FIGURE 4–A, the spring pushes the slip assembly upwardly until the toothed faces 170 of the slips are locked in engagement with the inner wall of the well tubing. FIGURES 4–A and 4–B particularly illustrate the relative positions of the upper and lower mandrels, the sheared pin 190, and the inwardly cammed latch balls 135. It will be noted in FIGURE 4–A that the recess 174 and thus the whole slip assembly is displaced upwardly a substantial distance above the locking elements. Since the upper and lower mandrels, when the tool is assembled, are secured together by the shear pin 190 in such a position that the latch balls 135 are only slightly below the shoulder 183, as shown in FIGURE 3–A, only a short upward movement of the upper mandrel is necessary for the lower face 174b of the recess 174 to cam the latch balls inwardly. Immediately upon release by the latch balls, the slip assembly will start moving into a "set" position though the upper mandrel may have been lifted by the impact blow to a level higher than necessary solely to release the slip assembly. As illustrated in FIGURE 4–A, the upper mandrel has moved an appreciable distance above the location where the latch balls pass the shoulder 183 and thus may be moved inwardly around the smaller diameter portion 181c of the upper end of the lower mandrel.

When the slip assembly has been moved by the above described procedure to a position in which the slips engage the casing or tubing wall, the tension tool is in proper condition to receive the impact force required to apply a pulling force on the object being set in or removed from the tubing. An upward impact force or jar is delivered to the tool through the fishing neck extension 113 to apply the pulling force to the object within the well to which the tool string is secured. The upward impact force on the fishing neck extension causes the annular face 123 on the extension to be forced against the internal annular face 120 within the extension lock 121 resulting in lifting the lock. Upward movement of the extension lock lifts the adaptor 130 and the upper mandrel 132 which is secured into the lower end of the adaptor. As previously indicated, the only connection between the upper mandrel and the lower mandrel 181 was through the shear pin 190. Once the shear pin is sheared in response to the initial impact force the mandrels are free to move relative to each other. Since the lower mandrel is connected through the adaptor sub 102 to the object to be pulled, an upward impact force delivered to the upper mandrel causes the upper mandrel to be lifted relative to the lower mandrel and thus compresses the members 185 which are confined between the upper face of the bottom sub 145 and the flange 182. The compression of the members 185 effects a storing of mechanical energy within such members which the members tend to release by expansion resulting in applying a force to the flange 182. An upward force on the flange 182 places the lower section of the lower mandrel in tension causing an upward pulling force to be applied to the object to be pulled. Simultaneously with the upward impact force which lifts the upper mandrel causing compression of the compressible members 185, the lock mandrel 151 is lifted with the upper mandrel by virtue of the engagement of the lock segments 125 within the recess 154 formed in the upper end of the lock mandrel. The impact force is delivered through the latch elements to lift the lock mandrel pulling it from beneath the slips 165 which are engaged with the inner wall of the tubing and are operably connected with the upper mandrel only through the coil spring 180. Due to the drag of the surfaces 170 of the slips and the energy absorbing characteristic of the spring, the slip assembly lags behind the upward movement of the lock mandrel. The impact force therefore abruptly withdraws the lock mandrel from within the slips allowing the slips to retract inwardly disengaging themselves from the wall of the tubing. Immediately upon disengagement of the slips from the wall of the tubing, the spring 180 pressing upon the lower end of the slips assembly through the ring 175 pushes the slips in an upward direction causing them to again be expanded along the slip expander surface 162 of the lock mandrel into locking engagement with the wall of the tubing. With the slips again engaged with the wall of the tubing, the well tool is held against downward movement and a portion of the energy of the impact blow is stored in the tool by the compression of the members 185 which energy in turn produces a pulling force between the tool and the object being set or positioned within the tubing by the tool. With each upward impact force delivered to the tool additional mechanical energy is stored within the compressible members and the tool is released from the tubing wall, lifted a short distance to a new elevation in the tubing, and re-engaged with the tubing wall. The impact forces are repeated until the object secured to the tool is properly set or is dislodged from its struck position within the well tubing, or until the members 185 have been fully compressed. FIGURES 4, 4-A and 4-B may be considered to represent the condition of the tool when the assembly of compressible members has been fully compressed and the lock assembly is engaged with the wall of the well tubing so that the maximum pulling force applicable by the tool is applied to the flange 182 by the compressed members 185 and such force is in turn exerted through the lower mandrel on the object secured to the lower end of the tool and to be manipulated by the tool.

When the tool 110 is to be released from the well tubing for relocation or removal, a downward impact force is delivered to the tool through the fishing neck extension 113. The downward impact force shears the shear pin 122 allowing the fishing neck extension to move downwardly until the lower end of th fishing neck 111 contacts the upper end of the extension lock 121. FIGURE 5 illustrates the shear pin severed and the fishing neck resting against the upper end of the extension lock. When the fishing neck extension has moved downwardly to a location where the shoulder 120 has passed the extension lock segments 125 the lock segments are free to move inwardly around the fiishing neck extension which is of the reduced diameter above the shoulder 120. When the lower end of the fishing neck 111 engages the upper end of the extension lock 121 the extension lock and thus the adaptor 130 along with the upper mandrel 132 are driven in a downward direction. Since the lock segments 125 are free to move inwardly, the lower surface 154b of the recess 154 within the lock mandrel 151 cams the latch elements 125 inwardly around the fishing neck extension thus freeing the extension lock and the members connected thereto to move relative to the lock mandrel since the latch elements have moved inwardly out of the recess 154. The fishing neck extension, the extension lock, the adaptor and the upper mandrel move downwardly until the lower end of the adaptor 130 engages the internal annular shoulder 163 within the lock mandrel 151. At the time the lower end of the adaptor engages the shoulder 163 the latch elements 125 are located at or below the recess 155 within the lock mandrel. The wedging effect upon the slips by the downward force of the slip expander surface 162 of the lock mandrel against the inner surfaces of the slips tends to force the slips into tighter engagement with the casing wall preventing downward movement of the tool, and thus it may be readily ascertained from the surface when the adaptor has engaged the inner shoulder of the lock mandrel and the members of the tool which have been displaced downwardly by the impact blow are in position to be lifted in an upward direction to effect disengagement of the tool from the tubing wall. The downward displacement of the fishing neck extension, the extension lock, the adaptor and the upper mandrel causes the heads of the screws 140 to engage the upper face of the spring washer 175 depressing the spring away from and thus relieving the load of the spring on the lower end of the base ring 172 of the slip assembly, as illustrated in FIGURE 5–A. Thus, with the members of the tool including the upper mandrel displaced downwardly relative to the lock mandrel, the load of the spring 180 on the slip assembly is removed and thus there is no force which will cause the slip assembly to follow the lock mandrel when the lock mandrel is lifted in an upward direction. To disengage the slips from the tubing wall, the fishing neck extension 113 is now lifted upwardly causing the shoulder 120 on the fishing neck extension to cam the latch elements 125 into the lower recess 155 within the lock mandrel. When the latch elements move into the lower recess, the fishing neck extension is free to continue upward movement until the shoulder 120 again engages the internal shoulder 123 within the extension lock with the outer diameter of the section 115 of the fishing neck extension holding the latch elements within the lower recess 155. With the extension lock engaged by the latch elements with the lock mandrel, the lock mandrel is lifted from beneath the slips since the slips are no longer being pushed upwardly by the spring 180 which is being held in a downward position away from the base ring of the slip assembly by the screws 140. The engagement of the toothed surfaces 170 with the inner wall of the tubing will tend to hold the slip assembly downward while the lock mandrel is lifted upwardly to withdraw the slip expander surface 162 from within the slips. As soon as the lock mandrel has moved a sufficient distance out of the slips, the slips will retract inwardly out of engagement with the inner wall of the tubing thus freeing the tool to allow it to move upward either for relocation or for removal from the tubing. With the spring 175 being held away from the slip assembly and the lock mandrel being held upwardly from beneath the slips, the slip assembly freely "floats" about the mandrel for movement of the tool.

It will be evident from the above description and drawings that the modified form of the tool of the invention provides new and improved apparatus for imposing a constantly increasing tension force upon an object being positioned within or removed from a well bore.

It will be apparent that the tool in the modified form of the invention is disengageable from the well tubing or casing by an upward impact force which applies an upward force to the lock mandrel by virtue of the provision of latch elements engageable in a recess within the lock mandrel for lifting the mandrel from within the slips.

It will be also seen that the modified form of the tool includes structure permitting the slip assembly spring to be disengaged from the slip assembly and thus allow the slip assembly to float in a substantially free state around the upper mandrel so that the tool may be moved within the tubing without engaging the slips with the inner wall of the tubing.

It will further be evident that the modified form of the invention includes a shear pin interconnecting the fishing neck extension and the extension lock which pin is fully enclosed within the members connected together by it whereby no portions of the pin are free within the well bore but rather remain within the parts through which it is engaged when the pin has been sheared.

A further modified form of the tension tool is illustrated in FIGURES 6 through 6–C. Referring to FIGURE 6 the member 12 is a tool such as a jar employed for supporting and actuating the tension tool 190.

Threadedly engaged into the lower end of the member 12 is a fishing neck 13 which is provided with a shoulder 14 to permit engagement of a pulling tool. The fishing neck extension 15 is threadedly engaged into the lower end of the fishing neck. The fishing neck extension is enlarged along a lower section 191 at the upper end of which an external annular shoulder 192 is formed. The fishing neck extension is secured against rotation in the fishing neck by a roll pin 193. An extension lock 194 is slidably engaged around the fishing neck extension. The extension lock is provided with an upper bore 195 adapted to fit around the upper portion of the fishing neck extension and with a larger lower bore 200 adapted to fit around the lower section 191 of the fishing neck extension. At the juncture of the upper and lower bores within the extension lock, an internal downwardly facing annular shoulder 201 is formed to cooperate with the shoulder 192 on the fishing neck extension to limit the upward movement of the fishing neck extension relative to the extension lock. A plurality of radially positioned slots 202 are formed through the extension lock to accommodate the latch elements 203, one of which is positioned in each of the slots. The extension lock is initially secured to the fishing neck extension by a shear pin 204 which prevents longitudinal movement of the two members relative to each other. An adaptor 205 is threadedly engaged into the lower end of the extension lock and secured to the extension lock by a roll pin 210 to prevent rotation relative thereto. An upper mandrel 211 is engaged with the lower end of the adaptor 205. The upper mandrel comprises an upper section 212, an intermediate section 213, and a lower section 214. The upper section 212 is restrained against rotation relative to the adaptor by a roll pin 215 secured through the adaptor into the upper end of the upper mandrel. The upper section of the upper mandrel is enlarged in external diameter along a lower portion 220 forming an upwardly facing shoulder 221 on the lower end of the mandrel section. The upper end of the intermediate mandrel section 213 is reduced in internal diameter along a section 222 forming an internal downwardly facing shoulder 223 adapted to engage the shoulder 221 on the lower end of the upper mandrel section. The upper and intermediate sections of the upper mandrel are initially secured together by a shear pin 224. An annular slip retainer 225 is threadedly engaged on the upper end of the intermediate section 213 of the upper mandrel and secured against rotation relative to the mandrel section by a screw 230. The intermediate section 213 of the upper mandrel, as shown in FIGURE 6–B, is provided with a plurality of radially positioned holes 231, each of which accommodates a latch ball 232. The lower end of the intermediate section is enlarged along a portion 233 providing an upwardly facing annular shoulder 234. A portion of the section 233 of the intermediate section of the upper mandrel is reduced in diameter providing a recess 235. The lower section 214 of the upper mandrel is secured to the lower end of the intermediate section of the mandrel by any suitable means, such as by welding at 240. A lower sub 241 is threadedly engaged into the lower end of the lower section of the upper mandrel and secured against rotation relative to the mandrel by a set screw 242 which extends through the mandrel section to bear against the lower sub.

Referring to FIGURES 6 and 6–A, a lock mandrel 243 is slidably engaged around the extension lock 194, the adaptor 205, and the upper section 212 of the upper mandrel. The lock mandrel is provided with an upper internal bore 244 which is of a diameter to form a sliding fit around the extension lock and adaptor. The lock mandrel is also provided, as shown in FIGURE 6, with an upper internal recess 245 and a lower internal recess 250, each of which is adapted to cooperate with the lock segments 203 at different steps in the procedure of operating the tool. The upper recess has an upper, downwardly and outwardly sloping face 245a and a lower upward and outwardly sloping face 245b. The lower recess 250 has an upper, downwardly and outwardly sloping face 250a and a lower, upwardly and outwardly sloping face 250b. The lock mandrel is provided with a port 251 to provide access to the roll pin 215. The lock mandrel is also provided with a lower bore 252 forming a sliding fit around the upper section 212 of the upper mandrel. At the juncture of the upper and lower bores of the lock mandrel an internal shoulder 253 is formed within the mandrel. A downwardly and inwardly sloping slip expander surface 254 is provided near the lower end of the lock mandrel to cam the slips outwardly for locking the tool within a tubing string.

A slip assembly 255 is slidably engaged around the upper mandrel to permit the tool to be locked against movement within a casing or tubing. The slip assembly comprises slips 260 having toothed outer surfaces 261, integrally formed resilient slip support arms 262, and a slip base ring 263. The base ring is threadedly engaged on a slip skirt 264 and restrained against rotation relative to the skirt by a set screw 265. The slip skirt is provided with a port 270 and with an internal annular recess 271 having an upper downwardly facing surface 271a and a lower upwardly facing surface 271b adapted to cooperate with the latch balls 232. Below the recess 271 the slip skirt 264 is enlarged in interal diameter along a section 272. A spring 273 is positioned around the lower section 213 of the upper mandrel to bias the slip assembly in an upward direction. A shear pin retainer 274 fits against the shoulder 234 on the lower end of the intermediate section of the upper mandrel around the recess 235. The spring 273 is confined between the lower end of the slip skirt 264 and the upper end of the shear pin skirt 274.

As shown in FIGURES 6–A through 6–C, a lower mandrel 280 is slidably engaged through the intermediate and lower sections of the upper mandrel. The lower mandrel comprises an upper section 281 and a lower section 282. The lower section is threadedly engaged into the lower end of the upper section and secured against rotation by a roll pin 283. The upper section 281 is reduced in diameter along a portion 284 at the lower end of which an external annular shoulder 285 is formed around the mandrel.

The lower end of the upper section 281 of the lower mandrel is provided with a section 290 which is of the enlarged diameter providing an external annular upwardly facing shoulder 291 to engage the lower end of the section 213 of the upper mandrel. The upper mandrel and the lower mandrel are initially secured together by a shear pin 291, as shown in FIGURE 6–B, which extends through the intermediate section 213 of the upper mandrel and the upper section 281 of the lower mandrel. The shear pin 291 is retained in position by the retainer 274 which engages the opposite ends of the shear pin.

The external diameter of the lower section 282 of the lower mandrel is sufficiently smaller than the internal bore of the lower section 214 of the upper mandrel to provide annular space 292 between the mandrels above the upper end of the lower sub 241 and below the lower end portion 290 of the upper section 281 of the lower mandrel. A plurality of compressible members 293, such as bellville washers, are positioned within the annular space 292 confined between the upper end of the lower sub 241 and the lower end of the upper section 281 of the lower mandrel.

An adaptor sub 102 is threadedly engaged on the lower end of the lower section 282 of the lower mandrel and is restrained against rotation relative to the lower sub by a roll pin 103 extending through both the adaptor sub and the lower section of the lower mandrel. A suitable tool 104 is secured to the lower end of the adaptor sub for positioning or pulling an object within a well bore.

The well tool 190 may function as a component of a wireline tool string for the purpose of positioning objects within or removing objects from the tubing or casing of a well bore in the same manner as previously discussed in connection with the embodiments of the well tool illustrated in FIGURES 1 through 5–B. The tension tool may be incorporated into the wireline tool string previously referred to. The tool string is lowered into the well bore and maniuplated until the object to be positioned or removed is secured to a pulling tool positioned within the tool string below the tension tool 190. An upward impact force is then imposed on the tension tool for the purpose of shearing the pin 291 to disengage the upper mandrel from the lower mandrel. The impact force imposes an upward force on the fishing neck extension 15 which is transmitted through the shoulders 201 and 192 to the extension lock 194. The upward force is transmitted through the extension lock and the adaptor 205 to the upper mandrel 211 which is lifted relative to the lower mandrel causing the shear pin 291, as shown in FIGURE 6–B, to be sheared releasing the upper mandrel to move upwardly relative to the lower mandrel. The lower mandrel restrained against upward movement since it is connected to the object to be pulled by the tension tool. When the shear pin is sheared, the upper mandrel is lifted and as the mandrel is lifted the latch balls 232 pass the shoulder 285 and are cammed inwardly toward the section 284 of the lower mandrel thereby releasing the slip assembly so that the slips may be urged into contact with the wall of the tubing of the well. The spring 273 biases the slip assembly in an upward direction due to its contact with the lower end of the skirt 264. As the slip assembly moves upwardly the lower face 271b of the recess 271 contacts the locking elements causing them to be displaced inwardly around the smaller diameter section 284 on the upper end of the lower mandrel. When the slip assembly is released by the locking elements and the spring pushes it upwardly, the slips 260 engage the tapered slip expander surface 254 of the lock mandrel 243 causing the slips to slide outwardly to engage the tubing wall with the serrated outer surfaces 261 of the slips.

The upward movement of the upper mandrel, in addition to effecting the setting of the slips in the manner described above, also compresses the members 293 within the annular space 292 since the members are confined between the upper end of the bottom sub 241 and the lower end 290 of the upper section of the lower mandrel, as shown in FIGURE 6–B. The compression of the members 293 constitutes a storing of mechanical energy which is exerted in the form of a tension or pulling force through the lower section 282 of the lower mandrel to impose a pulling force on the object to which the tool string is secured. Thus, the tension tool is anchored to the tubing wall by the slip assembly and utilizes the energy stored in the compressible members to exert a pulling force on the object to which the tool string is attached. The pulling force is exerted so long as the object remains stuck or otherwise secured within the tubing and the slip assembly remains engaged. The tension force may be steadily and progressively increased by repeated application of upward impact forces until the compressible members 293 are fully compressed. As each impact force is delivered to the tension tool the force is exerted through the fishing neck extension 15, the shoulders 201 and 202, the extension lock 194, and the upper mandrel through the adaptor 205. Lifting the upper mandrel causes further compression of the compressible members 293 to increase the tension force applied through the lower mandrel to the object being manipulated by the tool string, in the manner previously discussed. Simultaneously with the further storage of energy in the compressible members the upward movement of the fishing neck extension and extension lock is also transmitted to the lock mandrel 243 through the latch elements 203 which are lifted by the lower faces of the holes 202 to force the lock mandrel upwardly by engagement of the latch elements within the recess 245. Raising the lock mandrel causes the tapered slip expander surface 254 to be withdrawn from beneath the slips allowing the slips to retract inwardly out of contact with the tubing wall. When the lock mandrel is withdrawn from beneath the slips and the slips disengage the wall, the spring 273 pushes the slips again upwardly into contact with the slip expander surface 254 and back into engagement with the tubing wall. Due to the essentially rigid connection between the fishing neck and the intervening members of the tool to the lock mandrel, the lock mandrel reacts abruptly and immediately to an upward impact force, while, on the other hand, the slips are longitudinally operably connected with the upper mandrel only through the coil spring 273. The coil spring thus reacts with some delay to the impact blow allowing relocation of the lock mandrel, and subsequently the spring expands to cause the slip assembly to follow the lock mandrel and re-engage the tubing wall. The impact forces are repeated with the tension tool progressively "climbing" the tubing wall while imposing a steadily increasing tension or pulling force upon the object secured to the tool string. This procedure is continued until the positioning of the object is completed, until the object has been dislodged from a stuck condition within the tubing, or until the total energy absorbable by the tension tool has been utilized. The tool string must then be removed with the object or disengaged from the object if the object has not been dislodged from the tubing.

When the tension tool 190 is to be disengaged from the tubing wall so that the tool string and the object manipulated by it may be lifted from the well bore, a downward impact blow is imposed on the tool through the fishing neck 13. The fishing neck extension 15 is driven downwardly resulting in severing the shear pin 204 since the extension lock 194 resists downward movement due to its engagement through the lock segments 203 with the lock mandrel. The lock mandrel resists downward movement because of the wedging effect of the downwardly and inwardly tapered surface 254 within the slips 260. As the fishing neck extension moves downwardly, the shoulder 192 passes the latch elements 203 so that the lower surface of the recess 245 may cam the latch elements inwardly around the smaller diameter upper portion of the extension. Inward movement of the latch elements frees the extension lock 194 to move downwardly within the lock mandrel. When the lower end of the fishing neck extension engages the upper end of the adaptor 205 the adaptor along with the upper mandrel and the extension lock are all driven downwardly until the lower end of the adaptor engages the internal shoulder 253 within the lock mandrel. The distance between the lower end of the adaptor and the shoulder 253 is equal to or greater than the distance between the recesses 245 and 250 and therefore when the operator feels the impact of the lower end of the adaptor against the shoulder 253 the lock segments 203 will have been carried downwardly a sufficient distance for them to engage the recess 250 for purposes of lifting the lock mandrel from beneath the slips to release the tool. With the lower end of the adaptor in contact with the internal shoulder 253 an upward pull is exerted on the tool through the fishing neck extension to lift the fishing neck extension causing the shoulder 192 to cam the latch elements 203 outwardly into the recess 250 at which time the lower section 191 of the fishing neck extension will move within the lock segments to again permit the shoulders 201 and 192 to engage. When the shoulders are engaged the fishing neck extension will lift the extension lock to raise the lock mandrel by virtue of the engagement of the latch elements 203 within the lower recess 250. Upward movement of the lock mandrel from beneath the slips will allow the slips to retract from the tubing wall to free the tool and permit it to be lifted from the tubing. The relative positions of the latch elements and the lock mandrel will be substantially as illustrated in the tool of FIGURE 5.

The downward movement of the upper mandrel a sufficient distance for the latch elements 203 to engage the lower recess 250 obviously effects downward movement of the entire upper mandrel thereby carrying downwardly the slip retainer ring 225, as shown in FIGURE 6–A. The slip retainer ring engages the upper end of the slip skirt 264 causing retraction of the slips from the lock mandrel. With the slips so retracted from the lock mandrel and the lock segments 203 engaged in the lower recess 250 of the lock mandrel the lock mandrel and the slips will be maintained in a longitudinally spaced apart condition which will prevent the slips engaging the tubing wall as the tool string is lifted from the well bore.

A particularly advantageous feature of the embodiment of the tension tool illustrated in FIGURES 6 through 6–C is the telescoping feature of the upper mandrel as shown in FIGURE 6–A. The telescoping feature particularly adapts the tension tool 190 to be used with a setting or pulling tool which is disengageable by a downward force from the object being manipulated by the tool string. If the stuck object can not be removed after the maximum tension has been imposed on it by use of the tension tool, downward impact forces are applied to the tension tool in the above described manner to shear the pin 204 for releasing the slip assembly. With the slip assembly released, further downward impact forces are imposed from the tension tool forcing the upper mandrel downwardly to shear the pin 224 as shown in FIGURE 6–A. With the shear pin 224 sheared, the upper section 212 of the upper mandrel is free to be driven downwardly by the fishing neck extension, the extension lock, and the adaptor until the lower end of the upper section 212 of the upper mandrel engages the upper end of the lower mandrel 280. When the lower end of the upper section of the upper mandrel is engaged with the upper end of the lower mandrel a solid connection then exists between the upper end of the tension tool and the adaptor sub 102 which is connected to the pulling tool to be disengaged from the stuck object. Further downward blows on the upper end of the tension tool will, therefore, imposed sufficient force through the lower mandrel and the adaptor sub to disengage the pulling tool allowing release of the pulling tool from the object in the tubing so that the tool string may be withdrawn from the bore hole.

It will now be seen there has been described and illustrated a new and improved form of well tool for imposing a tension force on an object being positioned in or stuck within a well bore which tool includes means for imposing a downward force on a pulling tool used in conjunction therewith, such force being utilized to disengage the pulling tool from the object to which the pulling tool is secured.

It will be apparent that the well tension tool in the form illustrated in FIGURES 6 through 6–C includes a telescoping upper mandrel in which the upper and intermediate sections are engaged with each other by a shear pin which is sheared by a downward force subsequent to disengagement of the slip assembly of the tool from the tubing wall.

It will be further apparent that in the well tension tool utilizing the telescoping upper mandrel the upper section of the mandrel is severable from the intermediate section to permit the lower end of the upper section of the upper mandrel to engage the lower mandrel for imposing a downward force on a pulling tool engaged in the tool string below the tension tool for the purpose of disconnecting the pulling tool from an object within the tubing.

It will be also evident that the tension tool illustrated in the FIGURES 6–6–C includes upper and lower mandrels secured together by a shear pin which is severable by an upward impact blow exerted through the upper mandrel.

A still further modified form of a tension tool in accordance in the invention is represented in FIGURES 7–A, 7–B, and 8. Specifically, the form of tension tool illustrated in these figures represents the tension tool 190 of FIGURES 6 through 6–C with alternative forms of the slip assembly and the lock mandrel incorporated therein. Is is to be understood that the fragmentary views of FIGURES 7 and 7–A represent only that section of the tension tool of FIGURES 6 through 6–C which have incorporated alternative apparatus. In all other respects the tool of FIGURES 7 and 7–A includes identical structure to that of FIGURES 6 through 6–C. Therefore, those parts shown which are identical to the previously described tool are designated by the same reference numerals.

Referring specifically to FIGURE 7, the fishing neck extension is provided with a lower enlarged section 191 at the upper end of which is an external annular shoulder 192. The extension lock 300 is slidably engaged around the fishing neck extension and secured initially to the extension by the shear pin 204. The extension lock has an enlarged internal diameter along a lower section 301 to fit around the enlarged lower portion 191 of the fishing neck extension. At the upper end of the section 301 an internal annular shoulder 302 is formed within the extension lock to cooperate with the annular shoulder 192 on the fishing neck extension so that upward movement of the fishing extension will lift the extension lock. The extension lock is further provided with a plurality of radially positioned slots 303 each of which accommodates a latch element 203. The extension lock is additionally provided with an external annular shoulder 304 below which the extension lock is slightly enlarged in external diameter. The adaptor 205 is threadedly engaged in the lower end of the extension lock and secured against rotation by a roll pin 210. The upper end of the upper section 212 of the upper mandrel 211 is threadedly secured into the lower end of the adaptor. A roll pin 215 is connected between the upper mandrel and the adaptor to prevent rotation of the mandrel and the adaptor relative to each other.

As illustrated in FIGURES 7 and 7–A, a lock mandrel 305 is slidably positioned around the extension lock 300, the adaptor 205, and the upper section 212 of the upper mandrel. The upper bore 310 of the lock mandrel is sized to form a sliding fit around the extension lock and the adaptor while the lower bore 311, as seen in FIGURE 7–A, forms a sliding fit around the upper section 212 of the upper mandrel. At the juncture of the upper and lower bores of the lock mandrel an internal upwardly facing annular shoulder 312 is formed. The lock mandrel is provided with an upper internal annular recess 313 and a lower internal annular recess 314, both recesses being adapted to receive the latch elements 203 at different steps in the operation of the tool. The recess 313 has an upper, upwardly and inwardly sloping face 313a and a lower downwardly and inwardly sloping face 313b. The lower recess 314 has an upper upwardly and inwardly sloping face 314a and a lower downwardly and inwardly sloping face 314b. The upper end of the lock mandrel is provided with an externally threaded section 315 of reduced diameter. A plurality of downwardly and inwardly sloping slip expander surfaces 320 are formed on the lower end of the lock mandrel, each of the expander surfaces being provided with a longitudinal dovetail slot 321 which functions to secure and guide the slips used to engage the inner wall of a tubing or casing. An internally threaded retainer ring 322 is secured on the section 315 at the upper end of the lock mandrel 305. The retainer ring is provided with an inwardly extending flange providing a shoulder 323 which engages the shoulder 304 on the extension lock to limit the upward movement of the extension lock in the lock mandrel.

A slip 324 is slidably engaged on each of the sloping surfaces 320 at the lower end of the lock mandrel. Each of the slips is provided with a longitudinally extending guide member 325 along the back side to engage the dovetail slot 321 along the surface 320 for guiding and holding the slip in contact with the surface. An arm 330 is pivotally connected at the upper end thereof by a pin 331 into a slot 332 in the lower end of each of the slips. An internally threaded annular base ring 333 is secured on the upper end of the slip skirt 264. The base ring fits around and is spaced apart from both the upper end 222 of the intermediate section 213 of the upper mandrel and the retainer ring 225. The base ring is provided with an inwardly extending flange 334 which, in the position illustrated in FIGURE 7–A, is engageable with the upper ends of the upper mandrel section 213 and the retainer ring 225. The upper end of the base ring is provided with a plurality of radially positioned, longitudinally extending slots 335. Each arm 330 is pivotally secured at the lower end thereof into one of the slots 335 by a pin 340.

The procedural steps of operating the tension tool of FIGURES 7–8 are identical to those for operating the tool of FIGURES 6 through 6–C. When an upward impact force is applied to the upper mandrel through the fishing neck extension 15, the upward movement of the upper mandrel shears the shear pin 291 connecting the upper and lower mandrels. The upper mandrel is then free to move in an upward direction relative to the lower mandrel to allow the inward camming of the latch balls 323 to release the slip skirt 264 which is pushed upwardly by the spring 273. Upward movement of the skirt raises the base ring 333 pushing each arm 330 upwardly and its respective slip 324 along the sloping slip expander surfaces 320 into engagement with the inner wall of the casing or tubing in which the tool is positioned. The guide member 325 on each of the slips cooperates with a dovetail groove 321 in the lock mandrel to guide the slip in a straight line toward the wall. The pivotal connection between the arm and the slips and base ring readily permits the base ring to push the slips upwardly along the sloping surface without straining or deforming the parts of the slip assembly. Engagement of the slips with the lock mandrel provides a positive direct guide for the slips both during expansion and retraction.

With the slips locked so that the tool is restrained against downward movement, upward impact forces are applied to the tool by the jar or jars in the tool string to build up a pulling force on the object being manipulated by the tool string. With each upward force additional mechanical energy is stored in the compressible members while the lock mandrel is lifted with the upper mandrel causing disengagement of the slips 324 from the casing wall and subsequent re-engagement when the spring 273 again pushes the slips up the slip expander surfaces 320 into contact with the wall. Thus, the tool of FIGURES 7–8 "climbs" the tubing or casing wall as it steadily increases the tension or pulling force applied through the wireline tool string to the object being manipulated by the tool string.

When the tension tool is to be removed from the well bore, either for removing the object connected to it from the bore or for removing only the wireline tool string, the tension tool is subjected to a downward impact force which shears the shear pin 204. The fishing neck extension 15 is driven downwardly until the latch elements 203 are cammed inwardly around the extension above the shoulder 192 by the lower face 313b of the recess 313. The extension lock, along with the adaptor and upper mandrel, are forced downwardly causing the retainer ring 225, as shown in FIGURE 7–A, to engage the upper end of the slip skirt 264 to withdraw the slips from the casing or tubing wall by pulling them downwardly along the slip expander surfaces of the lock mandrel. With the slips withdrawn, an upward pull is applied to the tool causing the fishing neck extension 15 to be lifted, and, by engagement of the shoulders 302 and 192, to lift the extension lock and cam the latch elements 203 into the lower internal recess 314 of the lock mandrel. With the lock mandrel engaged by the lock segments, and, since the upper mandrel is downward a short distance by virtue of engagement of the lock segments in the lower recess 314 of the lock mandrel, the slips are held in the downward disengaged position of the lock mandrel and the tool may be lifted with the tool string from the well bore.

It will be seen that there has been described and illustrated in FIGURES 7–8 a new and improved form of tension or pulling tool utilizing a slip assembly which includes slips that are slidably engaged on a sloping surface of a slip expander mandrel so that the slips are positively directed into and away from contact with a surrounding surface with which the tool is locked against longitudinal movement.

It will be further evident that the means for securing the slips to the expander mandrel surfaces includes a groove along each expander mandrel surface in which a guide member of each slip interlocks to prevent disengagement of the slip from the mandrel during the travel of the slip between the extreme upward and downward positions. It will also be seen that the slips are interconnected with a base ring by arm members which are each pivotally connected at one end to the lower end of a slip and pivotally connected at the other end to the upper end of the base ring.

It will be evident that the lock mandrel includes a retainer ring threaded on the upper end thereof having an inwardly extending flange which engages an external annular shoulder around the extension lock to limit the upward movement of the extension lock relative to the lock mandrel. It will also be seen that a retainer ring secured around the upper mandrel is engageable with the upper end of the slip skirt permitting the slip assembly to be drawn downwardly and locked in a position in which the slips will remain retracted from any surrounding surface whereby the tool may be freely moved through a conduit or into and out of a well bore.

It will be seen that while the slip assembly is engaged by retainer ring to hold it in a downward position the lock mandrel is engageable in an internal recess by lock segments which lock the lock mandrel in an upward position relative to the slip assembly to insure sufficient longitudinal separation of the lock mandrel and slip assembly to prevent expansion of the slips during any desired free movement of the tool.

It will be evident that the other characteristics of the tool of FIGURES 7–8 relative to both structure and operation are similar to the tool illustrated in FIGURES 6–C.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool including: body means adapted to be supported in a well conduit; gripping means associated with said body means for releasably gripping the wall of the well conduit; impact means associated with said body means and said gripping means for moving said body means and said gripping means longitudinally of said conduit in response to impact forces applied thereto; connecting means operatively connected with said body means adapted to be connected to an object within said well conduit for applying a pulling force thereto; and means associated with said body means and said connecting means for receiving and storing mechanical energy delivered to said tool by said impact means, said means translating said mechanical energy into a pulling force for moving said connecting means with respect to said body means to apply a pulling force to the object connected therewith.

2. A tool adapted for use in a conduit to store mechanical energy and convert said energy to a pulling force to be applied to an object secured to said tool comprising in combination: mandrel means; gripping means operatively connected with said mandrel means for releasably engaging the wall of said conduit; impact means associated with said mandrel and said gripping means for moving said mandrel and said gripping means longitudinally with respect to said conduit in response to impact force applied to said mandrel means by said impact means; means associated with said mandrel means for receiving and storing mechanical energy delivered to said tool by said impact means; means associated with said mandrel means for translating said mechanical energy into a pulling force; and means for applying said pulling force to an object connected with said tool for moving said object with respect to said conduit.

3. A tool for applying a pulling force on an object within a conduit comprising: mandrel means; means operatively connected with said mandrel means for engaging said tool with and disengaging said tool from the wall of a conduit in response to impact forces applied to said tool whereby said tool is disengaged from the wall of said conduit, moves along said conduit, and re-engages the wall of said conduit in response to each force applied to said tool; mechanical energy storage means operatively associated with said mandrel means for storing mechanical energy applied to said tool by said impact forces which concurrently disengage said tool from said conduit, move said tool, and re-engage said tool with said conduit; and means operatively associated with said mandrel means for converting the stored energy into a force for pulling upon an object connected with said tool.

4. A tool for applying a force to an object within a conduit comprising in combination: mandrel means; means operatively connected with said mandrel means for releasably engaging said tool with the wall of said conduit whereby said tool is disengaged from the wall of said conduit and moved along said conduit is response to an impact force applied to said tool and re-engaged with the wall of said conduit when said force is diminished; means operatively associated with said mandrel means for storing mechanical energy derived from said impact force; means operatively associated with said mandrel means and said energy storage means for converting said mechanical energy into a pulling force; and means connected with said last mentioned means for applying said pulling force to an object secured to said tool.

5. A tool for applying a force to an object within a conduit comprising in combination: mandrel means; slip means operatively engaged on said mandrel means for releasably locking said tool within said conduit, said slip means being adapted to disengage from the wall of said conduit responsive to an impact force applied to said tool and to re-engage said wall as said force diminishes; mechanical energy storage means associated with said mandrel means for storing mechanical energy derived from impact force applied to said tool; and means associated with said storage means for converting the energy stored in said storage means to a tension force and applying said tension force to an object secured to said tool.

6. A mechanical extractor for applying a pulling force upon an object within a well bore comprising in combination: mandrel means; means operatively associated with said mandrel means for supporting said stool in a tool string; slip assembly means operatively associated with said mandrel means to releasably engage said tool with the wall of said well bore, said slip assembly means being adapted to release said tool in response to an impact force applied to said tool and to re-engage said tool as the energy of said impact force is expended; mechanical energy storage means operatively associated with said mandrel means for storing mechanical energy derived from impact force applied to said tool; and means for translating said mechanical energy into a pulling force and applying said pulling force to an object connected to said tool.

7. A tool for applying a pulling force to an object within a conduit comprising in combination: mandrel means; means for securing said mandrel means at one end to means for supporting said tool; slip assembly means operatively engaged on said mandrel, said slip assembly means being adapted to lock said tool within said conduit and being further adapted to disengage from said conduit in response to impact force applied to said tool and subsequently re-engage with the wall of said conduit as said impact force diminishes; mechanical energy storage means operatively associated with said mandrel means for storing energy derived from impact force applied to said tool; means operatively associated with said energy storage means for converting said energy to a pulling force; and means for connecting said tool to a member for applying said pulling force to said object.

8. A well tool for applying a pulling force to an object within a well bore comprising in combination: mandrel means; means provided at a first end of said mandrel means for connecting said tool into a tool string; slip means operatively secured on said mandrel means for engaging a surface around said tool within said well bore to restrain said tool against movement toward the object to which said tool applies a pulling force, said slip means being disengageable from said surface in response to impact force applied to said tool and re-engageable with said surface as said impact force diminishes whereby said tool may be progressively moved along said well bore in response to a plurality of impact forces and locked with said surface after the application of each of said impact forces; compressible means operatively associated with said mandrel means and adapted to be compressed in response to impact force applied to said tool for storing mechanical energy derived from said impact force; means operatively associated with said mandrel means and engageable with said compressible means to provide a pulling force from the mechanical energy stored in said compressible means; and means for applying said pulling force to a member connected to said well tool.

9. A well tool for applying a pulling force to an object secured to said tool within a well bore comprising in combination: upper mandrel means; lower mandrel means operatively conected with said upper mandrel means and securable to said upper mandrel means by means adapted to release upon application of impact force to said upper mandrel means; means connected to the upper end of said upper mandrel means for securing said tool in a tool string; means provided on the lower end of said lower mandrel means for engaging said tool within a tool string to means for connecting said tool to the object to which a pulling force is to be applied by said tool; slip assembly means operatively engaged on said upper mandrel means for releasably locking said tool in said well bore; spring means on said upper mandrel for biasing said slip assembly means in an upward direction; locking means provided by said mandrel means and said slip assembly means for locking said slip assembly means on said upper mandrel means in a position in which the slips are in a retracted position and for releasing said slip assembly means for longitudinal movement relative to said upper mandrel means in response to relative longitudinal movement between said upper mandrel means and said lower mandrel means; mechanical energy storage means operatively connected with said upper and lower mandrel means, said storage means including compressible means adapted to be compressed by impact forces tending to move said mandrel means away from each other and to expand to urge said mandrel means toward each other whereby a pulling force is exerted on said lower mandrel means.

10. A tool for applying a pulling force on an object within a well bore comprising in combination: an upper mandrel; a lower mandrel telescopically engaged with said upper mandrel and adapted to move longitudinally thereto; said upper and lower mandrels being engageable with each other by releasable means at a first longitudinal position of said mandrels; means provided on the upper end of said upper mandrel for securing said tool to supporting means in a well bore; means provided on the lower end of said lower mandrel for securing to the lower end of said tool additional well tools; a slip assembly operatively engaged on said upper mandrel and slidable longitudinally relative thereto for releasably securing said tool within said well bore to restrain said tool against downward movement, said slip assembly being disengageable from said well bore in response to impact force applied to said upper mandrel and re-engageable as said impact force diminishes; means provided on said upper and lower mandrels and said slip assembly for locking said slip assembly in a position where the slips of said assembly are retracted inwardly when said upper and lower mandrels are engaged with each other, said last mentioned means being operable in response to relative longitudinal movement of said upper and lower mandrels to release said slip assembly for longitudinal movement relative to said upper mandrel; compressible means confined between shoulders provided on said upper and lower mandrels, said compressible means being adapted to be compressed as an upward impact force is applied to said upper mandrel toward the shoulder on said lower mandrel for storing mechanical energy derived from said impact force in said compressible means, said compressible means tending to expand to force said shoulders on said upper and lower mandrels away from each other to apply a pulling force on said lower mandrel for pulling an object secured to said tool in said well bore below said lower mandrel.

11. A well tool for applying a pulling force to an object secured to said tool in a well comprising in combination: an upper mandrel; a lower mandrel telescopically engaged with said upper mandrel, said mandrels being movable longitudinally relative to each other; the upper end of said upper mandrel being connectible into a tool string whereby impact force may be applied to said tool through the upper end of said mandrel; means provided on the lower end of said lower mandrel for operatively connecting said tool to an object to be pulled upon by said tool; said upper and lower mandrels being securable together by releasable means at first relative longitudinal positions of said mandrels for inserting said tool into said well and engaging said tool string with said object to which a pulling force is to be applied; a slip assembly slidably engaged on said upper mandrel for releasably locking said tool in said well to restrain said tool from downward movement; said slip assembly including a lock mandrel having a slip expander surface for expanding and retracting the slips of said slip assembly, said lock mandrel being releasably engageable with said upper mandrel whereby said lock mandrel is lifted upwardly with said upper mandrel in response to upward impact force applied to said tool; a spring engaged between said slip assembly and said upper mandrel for biasing said slip assembly upwardly relative to said upper mandrel; compressible means for storing mechanical energy in response to upward impact force applied to said upper mandrel; means associated with said upper mandrel and said lower mandrel for confining said compressible means whereby relative movement of said mandrels away from each other effects compression of said compressible means and expansion of said compressible means urges said lower mandrel into said upper mandrel to exert a pulling force on a tool connected to the lower end of said lower mandrel; and locking means operably associated with said upper and lower mandrels and said slip assembly to restrain said slip assembly in a position whereby the slips are in retracted position when said mandrels are in first relative positions and for releasing said slip assembly to move along said upper mandrel when said mandrels move away from said first relative positions.

12. A well tool for applying a pulling force to an object within a well bore comprising in combination: an upper mandrel; a lower mandrel telescopically engaged with said upper mandrel and adapted to permit longitudinal movement of said mandrels relative to each other, said lower mandrel having means for connecting said tool to a member through which a pulling force may be applied from said tool; the upper end of the upper mandrel being adapted to be secured to a member through which an impact force may be applied to said tool; a lock mandrel slidably engaged on said upper mandrel; said lock mandrel having a lower slip expander surface; a slip assembly slidably positioned on said upper mandrel and slidable relative to said lock mandrel whereby the slips of said slip assembly and said slip expander surface on said lock mandrel may cooperate to effect expansion and contraction of said slips; means operatively connected with said upper mandrel for engaging said lock mandrel on said upper mandrel at a first position and for disengaging said lock mandrel from said upper mandrel for movement to a second position; means provided by said upper and lower mandrels and said slip assembly for locking said slip assembly in a retracted position when said mandrels are at first relative positions and unlocking said slip assembly from said upper mandrel when said mandrels are moved from said first relative positions; means engaged between said upper mandrel and said slip assembly for biasing said slip assembly toward expanded position; means providing a flange on said upper mandrel; means providing a flange on said lower mandrel; said flanges on said upper and lower mandrels being normally longitudinally spaced apart each from the other; compressible means confined between said flanges on said upper and lower mandrels whereby relative longitudinal movement of said upper and lower mandrels away from each other compresses said compressible means between said flanges; and means for releasably securing said upper and lower mandrels together to restrain said mandrels from movement relative to each other in relative positions whereby said slip assembly is in a retracted position, said means being adapted to disengage said upper and lower mandrels to free said mandrels for longitudinal movement relative to each other.

13. A tool for applying a pulling force to an object within a well bore comprising in combination: an upper mandrel; a lower mandrel telescopically engaged with said upper mandrel; said upper mandrel being provided with means at the upper end thereof for securing said tool to a source of impact force; said lower mandrel being provided with means on the lower end thereof for engaging said tool with a member to which a pulling force is applied by said tool through said lower mandrel; a lock mandrel slidably positioned around said upper mandrel, said lock mandrel having a slip expander surface for expanding and retracting slips to releasably engage said tool with a surrounding surface in a well bore; locking means operatively associated with said lock mandrel for releasably locking said lock mandrel against longitudinal movement relative to said upper mandrel; a slip assembly positioned on said upper mandrel below said lock mandrel, said slip assembly being slidable relative to said upper mandrel and said lock mandrel to permit the slips of said slip assembly to be expanded and contracted by said slip expander surface on said lock mandrel; a spring engaged between said slip assembly and said upper mandrel for biasing said slip assembly in an upward direction toward said lock mandrel; locking means provided by said upper and lower mandrels and said slip assembly to lock said slip assembly in a retracted position when said upper and lower mandrels are in first relative positions and to disengage said slip assembly for sliding movement relative to said upper mandrel when said upper and lower mandrels are displaced longitudinally from each other a predetermined distance from said first relative positions; a flange provided on said upper mandrel; a flange provided on said lower mandrel; said flanges on said upper and lower mandrels being positioned to move toward each other upon relative movement of said upper and lower mandrels away from each other; compressible means confined between said flange on said upper mandrel and said flange on said lower mandrel whereby relative movement of said upper and lower mandrels away from each other effects compression of said compressible members; and means for releasably securing said upper and lower mandrels together to restrain said mandrels against relative movement until a force of predetermined magnitude and direction is exerted between said mandrels to disengage said mandrels from each other.

14. A tool for exerting a pulling force upon an object within a well bore comprising in combination: an upper mandrel; securing means on the upper end of said upper mandrel for securing said tool to a member to permit application of an impact force to said tool; said securing means being slidable relative to said upper mandrel between extreme upper and lower positions relative to said mandrel and being securable at one of said positions by shearable means; a lock mandrel engaged on said upper mandrel and adapted to slide longitudinally relative to said upper mandrel, said lock mandrel having a downwardly and inwardly sloping lower slip expander surface for expanding and allowing retraction of slips; a slip assembly engaged on said upper mandrel below said lock mandrel and slidable relative to said upper mandrel, said slip assembly including slips each having an inner surface engageable with the slip expander surface of said lock mandrel; a spring positioned around said upper mandrel and engaged between the lower end of said slip assembly and said upper mandrel for biasing said slip assembly toward said lock mandrel; said slip assembly and said lock mandrel being movable to relative positions on said upper mandrel whereby said slips are held in retracted position during movement of said tool through a well bore; releasable locking means provided at the upper end of said tool for releasably securing said lock mandrel at a first position and for disengaging said lock mandrel to free said mandrel to move longitudinally relative to said upper mandrel in response to longitudinal movement of said securing means relative to said upper mandrel; locking means provided by said upper and lower mandrels and said slip assembly for locking said slip assembly against longitudinal movement on said upper mandrel at one relative position of said upper and lower mandrels and for releasing said slip assembly for longitudinal movement relative to said upper mandrel upon movement of said upper and lower mandrels away from said first relative position a predetermined distance; a first flange carried by said upper mandrel; a second flange being above said first flange whereby movement of said mandrels away from each other effects movement of said flanges toward each other; compressible means confined between said first and second flanges and adapted to be compressed by said flanges upon relative movement of said flanges toward each other; and means for releasably engaging said upper and lower mandrels whereby relative movement between said mandrels may be restrained until said tool is engaged with an object in a well bore to which a pulling force is to be applied, said means being operable to disengage said mandrels by application of a force tending to move said mandrels relative to each other.

15. A tool for applying a pulling force to an object positioned within a well bore comprising in combination an upper mandrel at least a portion of which is provided with a bore extending into said mandrel from the lower end thereof; a lower mandrel telescopically engaged within said upper mandrel, a portion of said lower mandrel extending into said bore of said upper mandrel; an adaptor secured on the upper end of said upper mandrel; an extension lock having a bore extending therethrough secured on the upper end of said adaptor, said extension lock having a plurality of radially positioned openings therethrough to accommodate latch elements; a latch element positioned in each of said openings through said extension lock; a fishing neck extension extending into said bore in said extension lock, a portion of said fishing neck extension extending above the upper end of said extension lock; said extension lock and said fishing neck extension having cooperating shoulders limiting the upward movement of said fishing neck extension relative to said extension lock; said extension lock and said fishing neck extension being adapted to be engaged with each other by a shear pin when said shoulders on said fishing neck extension and said extension lock are in engagement with each other; a lock mandrel slidably positioned around said upper mandrel, said adaptor, and said extension lock; said lock mandrel having an internal annular locking recess engageable by said latch elements in said openings through said extension lock when said lock mandrel is at a first longitudinal position; said lock mandrel having a downwardly and inwardly sloping lower slip expander surface for expanding slips outwardly into locking engagement with a surface surrounding said tool and retracting said slips from said surrounding surface; said lock mandrel being movable from said first position to permit retraction of said slips to allow movement of said tool through said well bore; a slip assembly slidably engaged on said upper mandrel below said lock mandrel, said slip assembly including a plurality of slips, a base ring, and arm members connected between said slips and said base ring, said slips being slidable along said expander surface on said lock mandrel for expanding and retracting said slips; a spring positioned around said upper mandrel and operatively associated with said upper mandrel and slip assembly for biasing said slip assembly in an upward direction; said upper mandrel being provided with a plurality of radially positioned openings extending through said mandrel and positioned longitudinally in the vicinity of the lower end of said slip assembly; a latch element positioned in each of said openings through said upper mandrel; said lower mandrel being provided with means adapted to cooperate with said latch elements in said upper mandrel for effecting inward and outward movement of said latch elements; means associated with said slip assembly for receiving said latch elements in said upper mandrel for locking said slip assembly in a downward position in which said slips are retracted from the surface of said well bore; an outwardly extending flange around said lower mandrel; an inwardly extending flange within said upper mandrel below said flange on said lower mandrel; compressible means positioned between the outer surface of said lower mandrel and the inner surface of said upper mandrel and confined between said flange on said lower mandrel and said flange on said upper mandrel whereby relative movement of said upper and lower mandrels in a direction to move said flanges toward each other effects compression of said compressible means whereby upward movement of said upper mandrel compresses said compressible means effecting a lifting force on said flange on said lower mandrel causing a pulling force to be exerted through said lower mandrel; and means provided by said upper and lower mandrels for releasably securing said mandrels together at relative positions to hold said slips in retracted positions until a predetermined force exerted on said mandrels releases said mandrels to move longitudinally relative to each other.

16. A tool for applying a pulling force to an object positioned within a well bore comprising in combination: an upper mandrel provided with a bore extending from the lower end thereof at least a portion of the length of said mandrel; a lower mandrel telescopically engaged within said upper mandrel, said upper and lower mandrels being adapted to slide longitudinally relative to each other, a portion of the lower end of said lower mandrel being extendable below the lower end of said upper mandrel to permit the connection thereto whereby said tool may apply a pulling force to a member connected to the lower end of said lower mandrel; an adaptor secured to the upper end of said upper mandrel, the lower end of said adaptor providing an annular downwardly facing shoulder around the upper end of said mandrel; an extension lock having a bore extending therethrough engaged on the upper end of said adaptor, said extension lock having a plurality of radially positioned openings therethrough to accommodate latch elements; a latch element positioned in each of said openings through said extension lock; a fishing neck extension slidably positioned within said bore of said extension lock and extending upwardly therefrom; said extension lock and said fishing neck extension each having an annular shoulder, said annular shoulders being adapted to engage each other to limit the upward movement of said fishing neck extension relative to said extension lock; said fishing neck extension being provided with means for receiving a shear pin for releasably securing said fishing neck extension and said extension lock against relative longitudinal movement with said annular shoulders on said fishing neck extension and said extension lock in engagement with each other; a lock mandrel slidably positioned around said upper mandrel, said adaptor, and said extension lock; said lock mandrel being provided with an internal annular locking recess engageable by said latch elements positioned in said openings through said extension lock to releasably engage said lock mandrel with said extension lock at a first longitudinal position of said lock mandrel; said lock mandrel being further provided with downwardly and inwardly sloping slip expander surfaces for expanding slips outwardly into locking engagement with a surface surrounding said tool and to permit retraction of said slips from said surrounding surface; said lock mandrel being additionally provided with an internal upwardly facing annular shoulder; a spring engaged between said upper mandrel and the lower end of said lock mandrel for biasing said lock mandrel upwardly away from said first longitudinal position to permit retraction of slips from said surrounding surface; a slip assembly slidably engaged on said upper mandrel below said lock mandrel, said slip assembly including a plurality of slips slidable along said slip expander surface on said lock mandrel for releasably engaging said tool with said surrounding surface, an arm connected to each of said slips, and a base ring around said upper mandrel engaged to the lower ends of said arms; means providing a downwardly facing shoulder around said upper mandrel adapted to engage the upper end of said base ring for limiting the upward movement of said slip assembly relative to said upper mandrel; said upper mandrel being provided with a plurality of radially positioned openings from said bore in said mandrel to beneath said base ring; a latch element positioned in each of said openings through said upper mandrel; said base ring being provided with an internal annular locking recess adapted to receive said latch elements for locking said slip assembly in a retracted position whereby said tool may be moved through a well bore without engagement of said slips with a surrounding surface; the upper end of said lower mandrel being provided with a portion of reduced diameter and an external annular upwardly facing shoulder, said shoulder being provided to cam said locking elements in said upper mandrel into said internal recess in said base ring and said portion of reduced diameter on said lower mandrel being provided to permit retraction of said locking elements from said recess and said base ring to release said slip assembly for sliding movement along said upper mandrel; a spring positioned around said upper mandrel and operatively engaged between said upper mandrel and the lower end of said base ring of said slip assembly for biasing said slip assembly in an upward direction; a portion of the bore of said upper mandrel and the portion of said lower mandrel being spaced apart to provide an annular space between said upper and said lower mandrels; an annular outwardly extending flange around said lower mandrel within said annular space; an inwardly extending flange on said upper mandrel at the lower end of said annular space below said flange on said lower mandrel; compressible means within said annular space between said shoulder on said lower mandrel and said shoulder on said upper mandrel whereby relative movement of said mandrels toward each other effects compression of said compressible means between said shoulders for storing mechanical energy in response to impact force applied to said upper mandrel and exerting said mechanical energy as a pulling force through said lower mandrel; and means for releasably securing said upper and lower mandrels together with said slip assembly in retracted position.

17. A tool for applying a pulling force to an object positioned within a well bore comprising in combination: an upper mandrel having a bore extending from the lower end thereof at least a portion of the length of said mandrel; a lower mandrel telescopically engaged within said upper mandrel, a portion of said lower mandrel being positioned within the bore of said upper mandrel; an adaptor secured on the upper end of said mandrel; an extension lock having a bore extending therethrough secured on the upper end of said adaptor, said extension lock being provided with a plurality of radially positioned openings therethrough to accommodate latch elements; a latch element positioned in each of said openings through said extension lock; the bore of said extension lock above said openings being reduced in diameter providing a downwardly facing annular shoulder within said extension lock; a fishing neck extension slidably positioned within said bore of said extension lock, a portion of said fishing neck extension extending above the upper end of said extension lock; the upper portion of said fishing neck extension being reduced in diameter to conform to the reduced diameter portion of the bore of said extension lock, said fishing neck extension having an upwardly facing annular shoulder at the lower end of said portion of reduced diameter, said shoulder being engageable with said internal downwardly facing shoulder of said extension lock to limit the upward movement of said fishing neck extension within said extension lock; means for releasably engaging said fishing neck extension with said extension lock when said shoulders in said fishing neck extension and said extension lock are engaged with each other; a lock mandrel slidably positioned around said upper mandrel, said adaptor and extension lock; said lock mandrel having an upper internal annular locking recess and a lower internal annular locking recess, each of said locking recesses being engageable by said latch elements in said openings through said extension lock for locking said lock mandrel in an upper position and a lower position relative to said extension lock; said lock mandrel having a downwardly and inwardly sloping lower slip expander surface for expanding slips outwardly into locking engagement with a surface surrounding said tool in said well and for allowing said slips to retract from said surrounding surface; said lock mandrel being further provided with an internal annular shoulder; a slip assembly slidably engaged on said upper mandrel below said lock mandrel, said slip assembly including a plurality of slips, a base ring, and arm members connected between said slips and said base ring, said slips being engageable with said expander surfaces on said lock mandrel for expanding and retracting said slips; a spring operatively engaged between said upper mandrel and the lower end of said base ring for biasing said slip assembly in an upward direction; means on said upper mandrel engageable with the upper end of said spring for limiting the upward movement of said spring to a level on said upper mandrel below the upper limit of travel of the lower end of said slip assembly whereby said slip assembly may be free from the biasing force of said spring; said upper mandrel being provided with a plurality of radially positioned openings extending through said mandrel below said base ring; a latch element positioned in each of said openings through said upper mandrel; said lower mandrel being reduced in diameter near the upper end thereof providing an upwardly facing annular shoulder, said portion of reduced diameter on said lower mandrel and said annular shoulder being adapted to function with said latch elements through said upper mandrel to releasably engage said slip assembly in a position wherein said slips are in retracted position; said base ring of said slip assembly being provided with an internal annular locking recess adapted to receive said latch elements in said openings through said upper mandrel; a portion of the external surface of said lower mandrel and the inner wall of said bore of said upper mandrel being spaced apart to provide an annular space between said upper and lower mandrels; an outwardly extending flange around said lower mandrel; an inwardly extending flange within said upper mandrel below said flange on said lower mandrel; compressible means positioned within said annular space between said upper and lower mandrels and confined between said flange on said lower mandrel and said flange on said upper mandrel whereby relative movement of said upper and lower mandrels in a direction to move said flanges toward each other effects compression of said compressible means whereby upward movement of said upper mandrel compresses said compressible means effecting a lifting force on said flange on said lower mandrel and causing a pulling force to be exerted through said lower mandrel; and means associated with said upper and lower mandrels for releasably securing said mandrels together at relative positions to hold said slips in retracted position until a predetermined force tending to force said mandrels apart releases said mandrels from each other to move longitudinally relative to each other.

18. A tool for applying a pulling force to an object positioned within a well bore comprising in combination: an upper mandrel having an upper section telescopically engaged with at least one lower section and secured thereto by shearable means adapted to be sheared responsive to a predetermined force on said upper section to drive said upper section downwardly relative to said lower section, said lower section being provided with a bore extending therethrough; a lower mandrel telescopically engaged with and slidable relative to said upper mandrel, said lower mandrel extending into the bore of said lower section of said upper mandrel, the upper end of said lower mandrel being engageable with the lower end of said upper section of said upper mandrel when said upper section of said upper mandrel is released from said lower section of said upper mandrel; an adaptor secured on the upper end of said upper mandrel; and extension lock having a bore extending therethrough secured on the upper end of said adaptor, said extension lock being provided with a plurality of radially positioned openings therethrough to accommodate latch elements; a latch element positioned in each of said openings through said extension lock; the bore of said extension lock above said openings being reduced in diameter providing a downwardly facing annular shoulder within said extension lock; a fishing neck extension slidably positioned within said bore of said extension lock, a portion of said fishing neck extension extending above the upper end of said extension lock; an upper portion of said fishing neck extension being reduced in diameter to conform to the reduced diameter portion of the bore of said extension lock, said fishing neck extension having an upwardly facing annular shoulder at the lower end of said portion of reduced diameter, said shoulder being engageable with said internal downwardly facing annular shoulder of said extension lock to limit the upward movement of said fishing neck extension within said extension lock; means for providing a releasable connection between said fishing neck extension and said extension lock when said annular shoulders on said fishing neck extension and in said extension lock are engaged with each other; a lock mandrel slidably positioned around said upper mandrel, said adaptor, and said extension lock, said lock mandrel having an upper internal annular locking recess and a lower internal annular locking recess, each of said locking recesses being engageable by said latch elements in said openings through said extension lock for locking said lock mandrel in an upper position and in a lower position relative to said extension lock; said lock mandrel having downwardly and inwardly sloping slip expander surfaces for expanding slips outwardly into locking engagement with a surface surrounding said tool in a well and for allowing said slips to retract from said surrounding surface; said lock mandrel being further provided with an upwardly facing internal annular shoulder; a slip assembly slidably engaged on said upper mandrel below said lock mandrel, said slip assembly including a plurality of slips, a base ring, and an arm member connected between each of said slips and said base ring, each of said slips being engageable with one of said expander surfaces on said lock mandrel for expanding and retracting said slips; an annular retainer ring engaged around the upper end of said lower section of said upper mandrel adapted to engage said slip assembly at said base ring for limiting the upward movement of said slip assembly relative to said upper mandrel; an annular skirt slidably engaged around said upper mandrel, the upper end of said skirt being secured to the lower end of said base ring, said skirt being provided with an internal annular locking recess; a spring operatively engaged between said upper mandrel and lower end of said skirt for biasing said slip assembly in an upward direction; said upper mandrel being provided with a plurality of radially positioned openings extending through said mandrel beneath said annular skirt; a latch element positioned in each of said openings through said upper mandrel to engage said recess in said skirt; said lower mandrel being reduced in diameter near the upper end thereof providing an upwardly facing annular shoulder at the lower end of said section of reduced diameter, said section of reduced diameter and said annular shoulder functioning with said latch elements through said upper mandrel to releasably secure said skirt of said slip assembly in a downward position wherein said slips are in retracted position; a portion of the external surface of said lower mandrel and the wall of said bore of said upper mandrel being spaced apart providing an annular space between said upper and said lower mandrels; an outwardly extending flange around said lower mandrel in said annular space; an inwardly extending flange on said upper mandrel in said annular space below said flange on said lower mandrel; compressible means positioned within said annular space and confined between said flange on said lower mandrel and said flange on said upper mandrel whereby upward movement of said upper mandrel relative to said lower mandrel compresses said compressible means effecting a lifting force on said flange on said lower mandrel causing a pulling force to be exerted through said lower mandrel; and means provided by said upper and lower mandrels for releasably securing said mandrels together at relative positions which hold said slips in retracted position until a predetermined force exerted on said mandrels releases said mandrels to move longitudinally relative to each other.

19. A tool in accordance with claim 18 for applying a pulling force to an object positioned within a well bore wherein: said extension lock is provided with an external annular upwardly facing shoulder above said openings therethrough; said lock mandrel is provided at the upper end thereof with an inwardly extending downwardly facing annular flange adapted to engage said upwardly facing external annular flange on said extension lock for limiting the upward movement of said extension lock relative to said lock mandrel; said slip expander surfaces on said lock mandrel each are provided with a longitudinal slot for guiding a slip along said surface; each of said slips are provided along the inner surface thereof with a longitudinally extending guide member adapted to engage said slot in said slip expander surface to secure said slip to said lock mandrel and guide said slip along said expander surface; and each of said arms are pivotally connected to the lower end of one of said slips and pivotally connected to the upper end of said base ring.

References Cited

UNITED STATES PATENTS

| | | | |
|---|---|---|---|
| 2,176,766 | 10/1939 | Johnston | 175—299 X |
| 2,358,466 | 9/1944 | Miller | 166—178 |
| 2,377,249 | 5/1945 | Lawrence | 166—98 |
| 2,829,716 | 4/1958 | Stewart | 166—98 |
| 3,225,843 | 12/1965 | Ortloff et al. | 175—94 |

CHARLES E. O'CONNELL, *Primary Examiner.*

R. E. FAVREAU, *Assistant Examiner.*

UNITED STATES PATENT OFFICE

CERTIFICATE OF CORRECTION

Patent No. 3,343,606　　　　　　　　　　　　September 26, 1967

William W. Dollison

It is hereby certified that error appears in the above numbered patent requiring correction and that the said Letters Patent should read as corrected below.

Column 7, line 19, for "impace" read -- impact --; column 10, line 21, for "srews" read -- screws --; line 35, for "with" read -- within --; column 13, line 45, for "th" read -- the --; column 19, line 39, for "imposed" read -- impose --; column 23, line 36, for "is" read -- in --; column 25, line 66, for "restrain" read -- restraining --; column 27, line 65, after "tion" insert a colon; column 31, line 54, for "and" read -- an --.

Signed and sealed this 15th day of October 1968.

(SEAL)

Attest:

Edward M. Fletcher, Jr.

Attesting Officer

EDWARD J. BRENNER

Commissioner of Patents